US011042708B1

(12) United States Patent
Pham et al.

(10) Patent No.: US 11,042,708 B1
(45) Date of Patent: *Jun. 22, 2021

(54) CONTEXT SALIENCY-BASED DEICTIC PARSER FOR NATURAL LANGUAGE GENERATION

(71) Applicant: Narrative Science Inc., Chicago, IL (US)

(72) Inventors: Michael Tien Thinh Pham, Chicago, IL (US); Nathan William Krapf, Chicago, IL (US); Stephen Emmanuel Hudson, Chicago, IL (US); Clayton Nicholas Norris, Chicago, IL (US)

(73) Assignee: NARRATIVE SCIENCE INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,746

(22) Filed: Dec. 27, 2018

Related U.S. Application Data

(60) Provisional application No. 62/612,820, filed on Jan. 2, 2018.

(51) Int. Cl.
    *G06F 40/30*     (2020.01)
    *G06F 40/205*    (2020.01)
    *G06F 40/295*    (2020.01)

(52) U.S. Cl.
    CPC ............ *G06F 40/30* (2020.01); *G06F 40/205* (2020.01); *G06F 40/295* (2020.01)

(58) Field of Classification Search
    CPC .... G06F 40/253; G06F 40/205; G06F 40/211; G06F 40/30; G06F 40/56
    See application file for complete search history.

(56) References Cited

U.S. PATENT DOCUMENTS

| 4,992,939 A | 2/1991 | Tyler |
| 5,619,631 A | 4/1997 | Schott |

(Continued)

FOREIGN PATENT DOCUMENTS

| WO | 9630844 A1 | 10/1996 |
| WO | 2006122329 A2 | 11/2006 |

(Continued)

OTHER PUBLICATIONS

EnglisheForums, "Direct Objects, Indirect Objects, Obliques, Dative Movement?", [online] https://www.englishforums.com, published 2007. (Year: 2007).*

(Continued)

*Primary Examiner* — Jialong He
(74) *Attorney, Agent, or Firm* — Thompson Coburn LLP

(57) ABSTRACT

NLG techniques are disclosed that apply computer technology to sentence data for performing entity referencing. For example, a processor can parse sentence data in a defined window of sentence data into a list of entity terms and a plurality of classifications associated with the listed entity terms. A processor can also compute a plurality of context saliency scores for a plurality of the listed entity terms based on the classifications associated with the listed entity terms. For new sentence data that refers to an entity term from the entity term list, a processor can select a referring term for referencing that entity term from a list of candidate referring terms based on the context saliency scores for the entity terms. A processor can then form the new sentence data such that the new sentence data includes the selected referring term to refer to the at least one entity term.

58 Claims, 22 Drawing Sheets

(56) References Cited

U.S. PATENT DOCUMENTS

| | | | |
|---|---|---|---|
| 5,734,916 A | 3/1998 | Greenfield et al. | |
| 5,794,050 A | 8/1998 | Dahlgren et al. | |
| 5,802,495 A | 9/1998 | Goltra | |
| 6,006,175 A | 12/1999 | Holzrichter | |
| 6,144,938 A | 11/2000 | Surace et al. | |
| 6,278,967 B1 | 8/2001 | Akers et al. | |
| 6,289,363 B1 | 9/2001 | Consolatti et al. | |
| 6,665,666 B1* | 12/2003 | Brown | G06F 16/3338 |
| 6,757,362 B1 | 6/2004 | Cooper et al. | |
| 6,771,290 B1 | 8/2004 | Hoyle | |
| 6,917,936 B2 | 7/2005 | Cancedda | |
| 6,968,316 B1 | 11/2005 | Hamilton | |
| 6,976,031 B1 | 12/2005 | Toupal et al. | |
| 7,027,974 B1 | 4/2006 | Busch et al. | |
| 7,246,315 B1 | 7/2007 | Andrieu et al. | |
| 7,324,936 B2 | 1/2008 | Saldanha et al. | |
| 7,333,967 B1 | 2/2008 | Bringsjord et al. | |
| 7,496,621 B2 | 2/2009 | Pan et al. | |
| 7,577,634 B2 | 8/2009 | Ryan et al. | |
| 7,610,279 B2 | 10/2009 | Budzik et al. | |
| 7,617,199 B2 | 11/2009 | Budzik et al. | |
| 7,617,200 B2 | 11/2009 | Budzik et al. | |
| 7,627,565 B2 | 12/2009 | Budzik et al. | |
| 7,644,072 B2 | 1/2010 | Budzik et al. | |
| 7,657,518 B2 | 2/2010 | Budzik et al. | |
| 7,716,116 B2 | 5/2010 | Schiller | |
| 7,778,895 B1 | 8/2010 | Baxter et al. | |
| 7,825,929 B2 | 11/2010 | Kincaid | |
| 7,836,010 B2 | 11/2010 | Hammond et al. | |
| 7,840,448 B2 | 11/2010 | Musgrove et al. | |
| 7,856,390 B2 | 12/2010 | Schiller | |
| 7,865,496 B1 | 1/2011 | Schiller | |
| 7,930,169 B2 | 4/2011 | Billerey-Mosier | |
| 8,046,226 B2 | 10/2011 | Soble et al. | |
| 8,311,863 B1 | 11/2012 | Kemp | |
| 8,355,903 B1 | 1/2013 | Birnbaum et al. | |
| 8,374,848 B1 | 2/2013 | Birnbaum et al. | |
| 8,442,940 B1 | 5/2013 | Faletti et al. | |
| 8,447,604 B1 | 5/2013 | Chang | |
| 8,463,695 B2 | 6/2013 | Schiller | |
| 8,494,944 B2 | 7/2013 | Schiller | |
| 8,515,737 B2 | 8/2013 | Allen | |
| 8,612,208 B2 | 12/2013 | Cooper et al. | |
| 8,630,844 B1 | 1/2014 | Nichols et al. | |
| 8,630,912 B2 | 1/2014 | Seki et al. | |
| 8,630,919 B2 | 1/2014 | Baran et al. | |
| 8,676,691 B2 | 3/2014 | Schiller | |
| 8,688,434 B1 | 4/2014 | Birnbaum et al. | |
| 8,762,133 B2 | 6/2014 | Reiter | |
| 8,762,134 B2 | 6/2014 | Reiter | |
| 8,762,285 B2 | 6/2014 | Davis et al. | |
| 8,775,161 B1 | 7/2014 | Nichols et al. | |
| 8,812,311 B2 | 8/2014 | Weber | |
| 8,843,363 B2 | 9/2014 | Birnbaum et al. | |
| 8,886,520 B1 | 11/2014 | Nichols et al. | |
| 8,892,417 B1 | 11/2014 | Nichols et al. | |
| 8,892,419 B2 | 11/2014 | Lundberg et al. | |
| 8,903,711 B2 | 12/2014 | Lundberg et al. | |
| 8,977,953 B1 | 3/2015 | Pierre et al. | |
| 9,135,244 B2 | 9/2015 | Reiter | |
| 9,164,982 B1* | 10/2015 | Kaeser | G06F 40/56 |
| 9,208,147 B1 | 12/2015 | Nichols et al. | |
| 9,244,894 B1 | 1/2016 | Dale et al. | |
| 9,251,134 B2 | 2/2016 | Birnbaum et al. | |
| 9,323,743 B2 | 4/2016 | Reiter | |
| 9,336,193 B2 | 5/2016 | Logan et al. | |
| 9,348,815 B1 | 5/2016 | Estes et al. | |
| 9,355,093 B2 | 5/2016 | Reiter | |
| 9,396,168 B2 | 7/2016 | Birnbaum et al. | |
| 9,396,181 B1 | 7/2016 | Sripada et al. | |
| 9,396,758 B2 | 7/2016 | Oz et al. | |
| 9,405,448 B2 | 8/2016 | Reiter | |
| 9,424,254 B2 | 8/2016 | Howald et al. | |
| 9,430,557 B2 | 8/2016 | Bhat et al. | |
| 9,460,075 B2 | 10/2016 | Mungi et al. | |
| 9,529,795 B2 | 12/2016 | Kondadadi et al. | |
| 9,535,902 B1 | 1/2017 | Michalak et al. | |
| 9,576,009 B1 | 2/2017 | Hammond et al. | |
| 9,697,178 B1 | 7/2017 | Nichols et al. | |
| 9,697,192 B1 | 7/2017 | Estes et al. | |
| 9,697,197 B1 | 7/2017 | Birnbaum et al. | |
| 9,697,492 B1 | 7/2017 | Birnbaum et al. | |
| 9,720,884 B2 | 8/2017 | Birnbaum et al. | |
| 9,720,899 B1 | 8/2017 | Birnbaum et al. | |
| 9,870,629 B2 | 1/2018 | Cardno et al. | |
| 9,946,711 B2 | 4/2018 | Reiter et al. | |
| 9,971,967 B2 | 5/2018 | Bufe, III et al. | |
| 9,977,773 B1 | 5/2018 | Birnbaum et al. | |
| 9,990,337 B2 | 6/2018 | Birnbaum et al. | |
| 10,019,512 B2 | 7/2018 | Boyle et al. | |
| 10,037,377 B2 | 7/2018 | Boyle et al. | |
| 10,049,152 B2 | 8/2018 | Ajmera et al. | |
| 10,115,108 B1 | 10/2018 | Gendelev et al. | |
| 10,162,900 B1 | 12/2018 | Chatterjee et al. | |
| 10,185,477 B1 | 1/2019 | Paley et al. | |
| 10,332,297 B1 | 6/2019 | Vadodaria | |
| 10,387,970 B1 | 8/2019 | Wang et al. | |
| 10,489,488 B2 | 11/2019 | Birnbaum et al. | |
| 10,565,308 B2 | 2/2020 | Reiter | |
| 10,621,183 B1 | 4/2020 | Chatterjee et al. | |
| 10,679,011 B2 | 6/2020 | Galitsky | |
| 10,699,079 B1 | 6/2020 | Paley et al. | |
| 10,706,236 B1 | 7/2020 | Platt et al. | |
| 10,747,823 B1 | 8/2020 | Birnbaum et al. | |
| 2002/0046018 A1 | 4/2002 | Marcu et al. | |
| 2002/0083025 A1 | 6/2002 | Robarts et al. | |
| 2002/0107721 A1 | 8/2002 | Darwent et al. | |
| 2003/0004706 A1 | 1/2003 | Yale et al. | |
| 2003/0061029 A1 | 3/2003 | Shaket | |
| 2003/0182102 A1* | 9/2003 | Corston-Oliver | G06F 40/56 704/9 |
| 2003/0216905 A1 | 11/2003 | Chelba et al. | |
| 2004/0015342 A1 | 1/2004 | Garst | |
| 2004/0034520 A1 | 2/2004 | Langkilde-Geary et al. | |
| 2004/0138899 A1 | 7/2004 | Birnbaum et al. | |
| 2004/0174397 A1 | 9/2004 | Cereghini et al. | |
| 2004/0225651 A1 | 11/2004 | Musgrove et al. | |
| 2004/0255232 A1 | 12/2004 | Hammond et al. | |
| 2005/0027704 A1 | 2/2005 | Hammond et al. | |
| 2005/0028156 A1 | 2/2005 | Hammond et al. | |
| 2005/0033582 A1 | 2/2005 | Gadd et al. | |
| 2005/0049852 A1 | 3/2005 | Chao | |
| 2005/0125213 A1 | 6/2005 | Chen et al. | |
| 2005/0137854 A1 | 6/2005 | Cancedda et al. | |
| 2005/0273362 A1 | 12/2005 | Harris et al. | |
| 2006/0031182 A1 | 2/2006 | Ryan et al. | |
| 2006/0101335 A1 | 5/2006 | Pisciottano | |
| 2006/0181531 A1 | 8/2006 | Goldschmidt | |
| 2006/0212446 A1 | 9/2006 | Hammond et al. | |
| 2006/0218485 A1 | 9/2006 | Blumenthal | |
| 2006/0224570 A1* | 10/2006 | Quiroga | G06F 16/3329 |
| 2006/0271535 A1 | 11/2006 | Hammond et al. | |
| 2006/0277168 A1 | 12/2006 | Hammond et al. | |
| 2007/0132767 A1 | 6/2007 | Wright et al. | |
| 2007/0136657 A1 | 6/2007 | Blumenthal et al. | |
| 2007/0185846 A1 | 8/2007 | Budzik et al. | |
| 2007/0185847 A1 | 8/2007 | Budzik et al. | |
| 2007/0185861 A1 | 8/2007 | Budzik et al. | |
| 2007/0185862 A1 | 8/2007 | Budzik et al. | |
| 2007/0185863 A1 | 8/2007 | Budzik et al. | |
| 2007/0185864 A1 | 8/2007 | Budzik et al. | |
| 2007/0185865 A1 | 8/2007 | Budzik et al. | |
| 2007/0250479 A1 | 10/2007 | Lunt et al. | |
| 2007/0250826 A1 | 10/2007 | O'Brien | |
| 2008/0005677 A1 | 1/2008 | Thompson | |
| 2008/0198156 A1 | 8/2008 | Jou et al. | |
| 2008/0250070 A1 | 10/2008 | Abdulla et al. | |
| 2008/0256066 A1 | 10/2008 | Zuckerman et al. | |
| 2008/0304808 A1 | 12/2008 | Newell et al. | |
| 2008/0306882 A1 | 12/2008 | Schiller | |
| 2008/0313130 A1 | 12/2008 | Hammond et al. | |
| 2009/0019013 A1 | 1/2009 | Tareen et al. | |
| 2009/0030899 A1 | 1/2009 | Tareen et al. | |
| 2009/0049041 A1 | 2/2009 | Tareen et al. | |

(56) References Cited

U.S. PATENT DOCUMENTS

| | | |
|---|---|---|
| 2009/0083288 A1 | 3/2009 | LeDain et al. |
| 2009/0119584 A1 | 5/2009 | Herbst |
| 2009/0144608 A1 | 6/2009 | Oisel et al. |
| 2009/0144609 A1* | 6/2009 | Liang .................. G06F 40/10 715/230 |
| 2009/0175545 A1 | 7/2009 | Cancedda et al. |
| 2009/0248399 A1 | 10/2009 | Au |
| 2010/0146393 A1 | 6/2010 | Land et al. |
| 2010/0161541 A1 | 6/2010 | Covannon et al. |
| 2010/0241620 A1 | 9/2010 | Manister et al. |
| 2010/0325107 A1 | 12/2010 | Kenton et al. |
| 2011/0022941 A1 | 1/2011 | Osborne et al. |
| 2011/0044447 A1 | 2/2011 | Morris et al. |
| 2011/0077958 A1 | 3/2011 | Breitenstein et al. |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha et al. |
| 2011/0113334 A1 | 5/2011 | Joy et al. |
| 2011/0213642 A1 | 9/2011 | Makar et al. |
| 2011/0246182 A1 | 10/2011 | Allen |
| 2011/0249953 A1 | 10/2011 | Suri et al. |
| 2011/0261049 A1 | 10/2011 | Cardno et al. |
| 2011/0288852 A1 | 11/2011 | Dymetman et al. |
| 2011/0295903 A1 | 12/2011 | Chen |
| 2011/0307435 A1 | 12/2011 | Overell et al. |
| 2011/0311144 A1 | 12/2011 | Tardif |
| 2011/0314381 A1 | 12/2011 | Fuller et al. |
| 2012/0011428 A1 | 1/2012 | Chisholm |
| 2012/0041903 A1 | 2/2012 | Beilby et al. |
| 2012/0069131 A1 | 3/2012 | Abelow |
| 2012/0109637 A1 | 5/2012 | Merugu et al. |
| 2012/0143849 A1 | 6/2012 | Wong et al. |
| 2012/0158850 A1 | 6/2012 | Harrison et al. |
| 2012/0166180 A1 | 6/2012 | Au |
| 2012/0265531 A1 | 10/2012 | Bennett |
| 2012/0310699 A1 | 12/2012 | McKenna et al. |
| 2013/0041677 A1 | 2/2013 | Nusimow et al. |
| 2013/0091031 A1 | 4/2013 | Baran et al. |
| 2013/0096947 A1 | 4/2013 | Shah et al. |
| 2013/0144605 A1 | 6/2013 | Brager et al. |
| 2013/0145242 A1 | 6/2013 | Birnbaum et al. |
| 2013/0173285 A1 | 7/2013 | Hyde et al. |
| 2013/0174026 A1 | 7/2013 | Locke |
| 2013/0185049 A1* | 7/2013 | Zhao .................. G06F 40/45 704/2 |
| 2013/0187926 A1 | 7/2013 | Silverstein et al. |
| 2013/0211855 A1 | 8/2013 | Eberle et al. |
| 2013/0238330 A1 | 9/2013 | Casella dos Santos |
| 2013/0246934 A1 | 9/2013 | Wade et al. |
| 2013/0253910 A1 | 9/2013 | Turner et al. |
| 2013/0262092 A1 | 10/2013 | Wasick |
| 2013/0275121 A1 | 10/2013 | Tunstall-Pedoe |
| 2013/0304507 A1 | 11/2013 | Dail et al. |
| 2013/0316834 A1 | 11/2013 | Vogel et al. |
| 2014/0006012 A1 | 1/2014 | Zhou et al. |
| 2014/0040312 A1 | 2/2014 | Gorman et al. |
| 2014/0062712 A1 | 3/2014 | Reiter |
| 2014/0075004 A1 | 3/2014 | Van Dusen et al. |
| 2014/0134590 A1 | 5/2014 | Hiscock, Jr. |
| 2014/0163962 A1 | 6/2014 | Castelli et al. |
| 2014/0200878 A1 | 7/2014 | Mylonakis et al. |
| 2014/0201202 A1 | 7/2014 | Jones et al. |
| 2014/0208215 A1 | 7/2014 | Deshpande |
| 2014/0314225 A1 | 10/2014 | Riahi et al. |
| 2014/0351281 A1 | 11/2014 | Tunstall-Pedoe |
| 2014/0356833 A1 | 12/2014 | Sabczynski et al. |
| 2014/0372850 A1 | 12/2014 | Campbell et al. |
| 2014/0375466 A1 | 12/2014 | Reiter |
| 2015/0049951 A1 | 2/2015 | Chaturvedi et al. |
| 2015/0078232 A1 | 3/2015 | Djinki et al. |
| 2015/0134694 A1 | 5/2015 | Burke et al. |
| 2015/0142704 A1 | 5/2015 | London |
| 2015/0161997 A1 | 6/2015 | Wetsel et al. |
| 2015/0169548 A1 | 6/2015 | Reiter |
| 2015/0178386 A1 | 6/2015 | Oberkampf et al. |
| 2015/0186504 A1 | 7/2015 | Gorman et al. |
| 2015/0199339 A1 | 7/2015 | Mirkin et al. |
| 2015/0227508 A1 | 8/2015 | Howald et al. |
| 2015/0227588 A1 | 8/2015 | Shapira et al. |
| 2015/0242384 A1 | 8/2015 | Reiter |
| 2015/0261745 A1 | 9/2015 | Song et al. |
| 2015/0268930 A1* | 9/2015 | Lee .................. G06F 16/36 707/754 |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0325000 A1 | 11/2015 | Sripada |
| 2015/0331846 A1 | 11/2015 | Guggilla et al. |
| 2015/0331850 A1 | 11/2015 | Ramish |
| 2015/0332665 A1 | 11/2015 | Mishra et al. |
| 2015/0347400 A1 | 12/2015 | Sripada |
| 2015/0347901 A1 | 12/2015 | Cama et al. |
| 2015/0356967 A1 | 12/2015 | Byron et al. |
| 2015/0363364 A1 | 12/2015 | Sripada |
| 2015/0370778 A1 | 12/2015 | Tremblay et al. |
| 2016/0019200 A1 | 1/2016 | Allen |
| 2016/0026253 A1 | 1/2016 | Bradski et al. |
| 2016/0027125 A1 | 1/2016 | Bryce |
| 2016/0054889 A1 | 2/2016 | Hadley et al. |
| 2016/0103559 A1 | 4/2016 | Maheshwari et al. |
| 2016/0132489 A1 | 5/2016 | Reiter |
| 2016/0140090 A1 | 5/2016 | Dale et al. |
| 2016/0196491 A1 | 7/2016 | Chandrasekaran et al. |
| 2016/0217133 A1 | 7/2016 | Reiter et al. |
| 2016/0232152 A1 | 8/2016 | Mahamood |
| 2016/0232221 A1 | 8/2016 | McCloskey et al. |
| 2016/0314121 A1 | 10/2016 | Arroyo et al. |
| 2017/0004415 A1 | 1/2017 | Moretti et al. |
| 2017/0017897 A1 | 1/2017 | Bugay et al. |
| 2017/0024465 A1 | 1/2017 | Yeh et al. |
| 2017/0026705 A1 | 1/2017 | Yeh et al. |
| 2017/0060857 A1 | 3/2017 | Imbruce et al. |
| 2017/0061093 A1 | 3/2017 | Amarasingham et al. |
| 2017/0068551 A1 | 3/2017 | Vadodaria |
| 2017/0116327 A1 | 4/2017 | Gorelick et al. |
| 2017/0140405 A1 | 5/2017 | Gottemukkala et al. |
| 2017/0185674 A1* | 6/2017 | Tonkin .................. G06F 16/328 |
| 2017/0199928 A1 | 7/2017 | Zhao et al. |
| 2017/0212671 A1 | 7/2017 | Sathish et al. |
| 2017/0213157 A1 | 7/2017 | Bugay et al. |
| 2017/0228372 A1 | 8/2017 | Moreno et al. |
| 2017/0242886 A1 | 8/2017 | Jolley et al. |
| 2017/0270105 A1 | 9/2017 | Ninan et al. |
| 2017/0293864 A1 | 10/2017 | Oh et al. |
| 2017/0358295 A1 | 12/2017 | Roux et al. |
| 2017/0371856 A1 | 12/2017 | Can et al. |
| 2018/0025726 A1 | 1/2018 | Gatti de Bayser et al. |
| 2018/0082184 A1 | 3/2018 | Guo et al. |
| 2018/0114158 A1 | 4/2018 | Foubert et al. |
| 2018/0232443 A1 | 8/2018 | Delgo et al. |
| 2018/0260380 A1 | 9/2018 | Birnbaum et al. |
| 2018/0261203 A1 | 9/2018 | Zoller et al. |
| 2018/0285324 A1 | 10/2018 | Birnbaum et al. |
| 2018/0314689 A1 | 11/2018 | Wang et al. |
| 2019/0042559 A1* | 2/2019 | Allen .................. G06N 5/02 |
| 2019/0138615 A1 | 5/2019 | Huh et al. |
| 2020/0074310 A1 | 3/2020 | Li et al. |
| 2020/0089735 A1 | 3/2020 | Birnbaum et al. |

FOREIGN PATENT DOCUMENTS

| | | |
|---|---|---|
| WO | 2014035400 A1 | 3/2014 |
| WO | 2014035402 A1 | 3/2014 |
| WO | 2014035403 A1 | 3/2014 |
| WO | 2014035406 A1 | 3/2014 |
| WO | 2014035407 A1 | 3/2014 |
| WO | 2014035447 A1 | 3/2014 |
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |

(56) References Cited

FOREIGN PATENT DOCUMENTS

| WO | 2014111753 A1 | 7/2014 |
|----|---------------|--------|
| WO | 2015028844 A1 | 3/2015 |
| WO | 2015159133 A1 | 10/2015 |

OTHER PUBLICATIONS

Allen et al., "StatsMonkey: A Data-Driven Sports Narrative Writer", Computational Models of Narrative: Papers from the AAAI Fall Symposium, Nov. 2010, 2 pages.

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS-1998).

Character Writer Version 3.1, Typing Chimp Software LLC, 2012, screenshots from working program, pp. 1-19.

Cyganiak et al., "RDF 1.1 Concepts and Abstract Syntax", W3C Recommendation, 2014, vol. 25, No. 2.

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

Gatt, A., and Portet, F. (2009). Text content and task performance in the evaluation of a Natural Language Generation System. Proceedings of the Conference on Recent Advances in Natural Language Processing (RANLP-09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural-Language Processing to Produce Weather Forecasts. IEEE Expert, 9 (2), 45.

Hargood, C., Millard, D. and Weal, M. (2009) Exploring the Importance of Themes in Narrative Systems.

Hargood, C., Millard, D. and Weal, M. (2009). Investigating a Thematic Approach to Narrative Generation, 2009.

Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.

Kittredge, R., and Lavoie, B. (1998). MeteoCogent: A Knowledge-Based Tool for Generating Weather Forecast Texts. In Proceedings of the American Meteorological Society AI Conference (AMS-98), Phoenix, Arizona.

Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Association for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Washington, DC.

McKeown, K., Kukich, K., & Shaw, J. (1994). Practical issues in automatic documentation generation. 4th Conference on Applied Natural Language Processing, Stuttgart, Germany, pp. 7-14.

Meehan, James R., TALE-SPIN. (1977). An Interactive Program that Writes Stories. In Proceedings of the Fifth International Joint Conference on Artificial Intelligence.

Memorandum Opinion and Order for O2 Media, LLC v. Narrative Science Inc., Case 1:15-cv-05129 (N.D. IL), Feb. 25, 2016, 25 pages (invalidating claims of U.S. Pat. No. 7,856,390, U.S. Pat. No. 8,494,944, and U.S. Pat. No. 8,676,691 owned by O2 Media, LLC.

Moncur, W., and Reiter, E. (2007). How Much to Tell? Disseminating Affective Information across a Social Network. Proceedings of Second International Workshop on Personalisation for e-Health.

Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.

Movie Magic Screenwriter, Write Brothers, 2009, user manual.

Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.

Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.

Reiter et al., "Building Applied Natural Generation Systems", Cambridge University Press, 1995, pp. 1-32.

Reiter, E. (2007). An architecture for Data-To-Text systems. In: Busemann, Stephan (Ed.), Proceedings of the 11th European Workshop on Natural Language Generation, pp. 97-104.

Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.

Reiter, E., Sripada, S., Hunter, J., Yu, J., and Davy, I. (2005). Choosing words in computer-generated weather forecasts. Artificial Intelligence, 167:137-169.

Riedl et al., "From Linear Story Generation to Branching Story Graphs", IEEE Computer Graphics and Applications, 2006, pp. 23-31.

Riedl et al., "Narrative Planning: Balancing Plot and Character", Journal of Artificial Intelligence Research, 2010, pp. 217-268, vol. 39.

Robin, J. (1996). Evaluating the portability of revision rules for incremental summary generation. Paper presented at Proceedings of the 34th. Annual Meeting of the Association for Computational Linguistics (ACL'96), Santa Cruz, CA.

Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.

Smith, "The Multivariable Method in Singular Perturbation Analysis", SIAM Review, 1975, pp. 221-273, vol. 17, No. 2.

(56) References Cited

OTHER PUBLICATIONS

Sripada, S., Reiter, E., and Davy, I. (2003). SumTime-Mousam: Configurable Marine Weather Forecast Generator. Expert Update 6(3):4-10.

Storyview, Screenplay Systems, 2000, user manual.

Theune, M., Klabbers, E., Odijk, J., dePijper, J., and Krahmer, E. (2001) "From Data to Speech: A General Approach", Natural Language Engineering 7(1): 47-86.

Thomas, K., and Sripada, S. (2007). Atlas.txt: Linking Geo-referenced Data to Text for NLG. Paper presented at Proceedings of the 2007 European Natural Language Generation Workshop (ENLGO7).

Thomas, K., and Sripada, S. (2008). What's in a message? Interpreting Geo-referenced Data for the Visually-impaired. Proceedings of the Int. conference on NLG.

Thomas, K., Sumegi, L., Ferres, L., and Sripada, S. (2008). Enabling Access to Geo-referenced Information: Atlas.txt. Proceedings of the Cross-disciplinary Conference on Web Accessibility.

Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.

Yu, J., Reiter, E., Hunter, J., and Mellish, C. (2007). Choosing the content of textual summaries of large time-series data sets. Natural Language Engineering, 13:25-49.

Yu, J., Reiter, E., Hunter, J., and Sripada, S. (2003). SUMTIME-TURBINE: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).

Roberts et al., "Lessons on Using Computationally Generated Influence for Shaping Narrative Experiences", IEEE Transactions on Computational Intelligence and AI in Games, Jun. 2014, pp. 188-202, vol. 6, No. 2, doi: 10.1109/TCIAIG .2013.2287154.

Mack et al., "A Framework for Metrics in Large Complex Systems", IEEE Aerospace Conference Proceedings, 2004, pp. 3217-3228, vol. 5, doi: 10.1109/AERO .2004.1368127.

Mahamood et al., "Generating Annotated Graphs Using the NLG Pipeline Architecture", Proceedings of the 8th International Natural Language Generation Conference (INLG), 2014.

Segel et al., "Narrative Visualization: Telling Stories with Data", Stanford University, Oct. 2010, 10 pgs.

Office Action for U.S. Appl. No. 16/233,776 dated Jun. 2, 2020.

Response to Office Action for U.S. Appl. No. 16/233,776 dated Jun. 2, 2020.

* cited by examiner

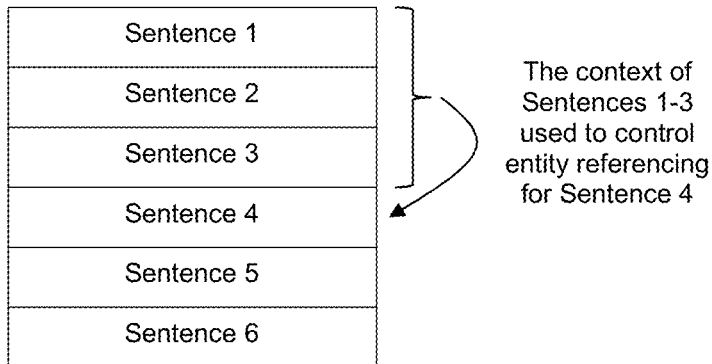
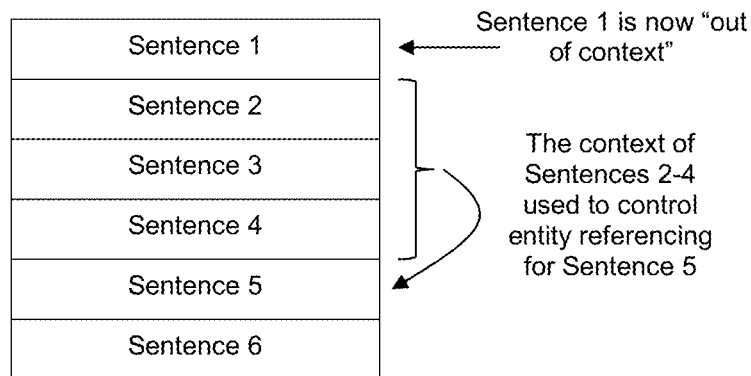
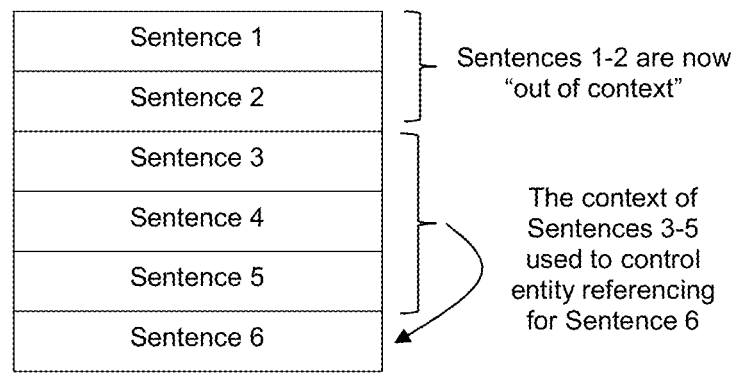
Figure 3

Scoring Rules

| Class | Points |
|---|---|
| Subject | 8 |
| Object | 4 |

*Scores decay by 50% each sentence interval (where scores below 1 are rounded to zero)
*This means that subjects have a scoring window of 4 intervals (8, 4, 2, 1)
*This means that objects have a scoring window of 3 intervals (4, 2, 1)

Figure 5B

| | | | | |
|---|---|---|---|---|
| Current | Entity Term 1 (8) | | | Entity Term 4 (4) |
| Sums | Entity Term 1 (8) | | | Entity Term 4 (4) |

Entity Term List (250)

| Entity Term | Context Saliency Score |
|---|---|
| ET1 | 8 |
| ET4 | 4 |

Figure 5C

| | | | | |
|---|---|---|---|---|
| Current | | Entity Term 2 (4) | Entity Term 3 (8) | |
| t-1 | Entity Term 1 (4) | | | Entity Term 4 (2) |
| Sums | Entity Term 1 (4) | Entity Term 2 (4) | Entity Term 3 (8) | Entity Term 4 (2) |

Entity Term List (250)

| Entity Term | Context Saliency Score |
|---|---|
| ET1 | 4 |
| ET2 | 4 |
| ET3 | 8 |
| ET4 | 2 |

Figure 5D

| | | | | |
|---|---|---|---|---|
| Current | Entity Term 1 (8) | Entity Term 2 (4) | | |
| t-1 | | Entity Term 2 (2) | Entity Term 3 (4) | |
| t-2 | Entity Term 1 (2) | | | Entity Term 4 (1) |
| Sums | *Entity Term 1 (10)* | *Entity Term 2 (6)* | *Entity Term 3 (4)* | *Entity Term 4 (1)* |

Entity Term List (250)

| Entity Term | Context Saliency Score |
|---|---|
| ET1 | 10 |
| ET2 | 6 |
| ET3 | 4 |
| ET4 | 1 |

Figure 5E

| | | | | |
|---|---|---|---|---|
| Current | | Entity Term 2 (4) | | Entity Term 4 (8) |
| t-1 | Entity Term 1 (4) | Entity Term 2 (2) | | |
| t-2 | | Entity Term 2 (1) | Entity Term 3 (2) | |
| t-3 | Entity Term 1 (1) | | | Entity Term 4 (0) |
| Sums | *Entity Term 1 (5)* | *Entity Term 2 (7)* | *Entity Term 3 (2)* | *Entity Term 4 (8)* |

Entity Term List (250)

| Entity Term | Context Saliency Score |
|---|---|
| ET1 | 5 |
| ET2 | 7 |
| ET3 | 2 |
| ET4 | 8 |

Figure 5F

| | | | | |
|---|---|---|---|---|
| Current | Entity Term 1 (4) | Entity Term 2 (8) | | Entity Term 4 (4) |
| t-1 | | Entity Term 2 (2) | | Entity Term 4 (4) |
| t-2 | Entity Term 1 (2) | Entity Term 2 (1) | | |
| t-3 | | Entity Term 2 (0) | Entity Term 3 (1) | |
| t-4 | Entity Term 1 (0) | | | Entity Term 4 (0) |
| Sums | *Entity Term 1 (6)* | *Entity Term 2 (11)* | *Entity Term 3 (1)* | *Entity Term 4 (8)* |

Entity Term List (250)

| Entity Term | Context Saliency Score |
|---|---|
| ET1 | 6 |
| ET2 | 11 |
| ET3 | 1 |
| ET4 | 8 |

Figure 5G

Scoring Rules

| Class | Points |
|---|---|
| Subject | 8 |
| Direct Object | 4 |
| Indirect Object | 2 |

Scoring Rules

| Class | Points |
|---|---|
| Subject | 8 |
| Direct Object | 4 |
| Oblique Object | 1 |

Scoring Rules

| Class | Points |
|---|---|
| Subject | 8 |
| Direct Object | 4 |
| Indirect Object | 2 |
| Oblique Object | 1 |

Figure 5H

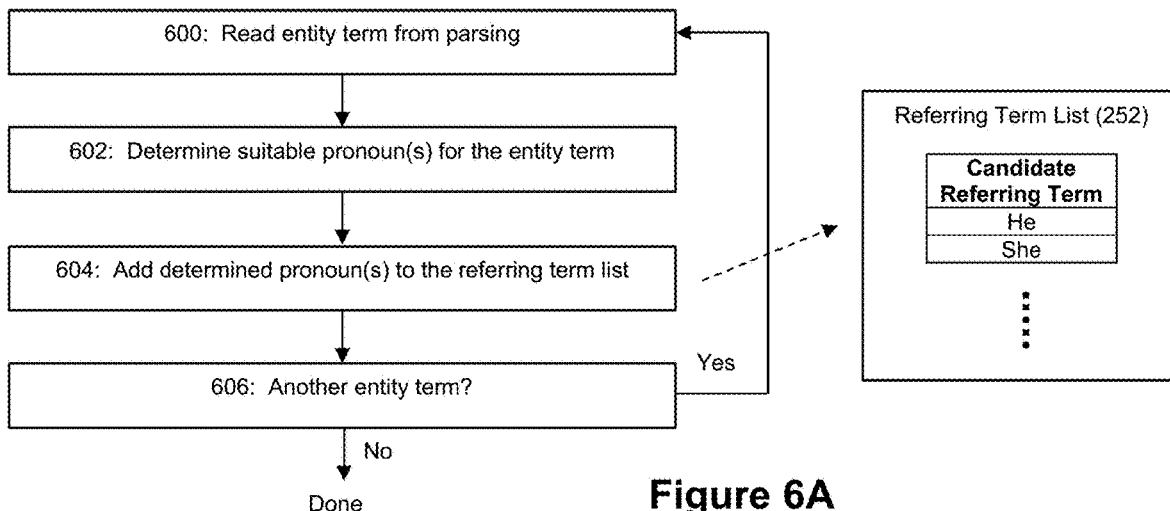

Figure 6A

| κ contextually salient entities | ג Referring terms (R-terms) | |
|---|---|---|
| α<br>β<br>γ<br>... | 3s.m:<br>3s.f:<br>3s.n:<br>3p: | Pronouns<br>(PRO) |
| | A.s:<br>A.p:<br>B.s:<br>B.p:<br>Γ.s:<br>Γ.p:<br>... | Entity types<br>(e-types) |

(1) Ex.
- α = Mary; A.s = student; A.p = students
- β & γ = Ford&Chrysler; B.s = company; B.p = companies
- β = Ford
- γ = Chrysler

Figure 10

(2) Ex.
- Data: Mary & Peter are students
- Prior sentence ($S_{-1}$): *Mary, who read the most books, kissed Peter.*

| κ contextually salient entities | α Referring terms (R-terms) | |
|---|---|---|
| Mary<br>Peter<br>α & β | 3s.m:<br>3s.f:<br>3s.n:<br>3p: | Pronouns<br>(PRO) |
| | student<br>students | Entity types<br>(e-types) |

Figure 11A (3)

| κ contextually salient entities | α Referring terms (R-terms) | |
|---|---|---|
| α (Mary):<br>β (Peter):<br>α & β: | 3s.m:<br>3s.f:<br>3s.n:<br>3p: | Pronouns<br>(PRO) |
| | student:<br>students: | Entity types<br>(e-types) |

Figure 11B (4)

| x contextually salient entities | 1. Referring terms (R-terms) | |
|---|---|---|
| α (Mary): 8<br>β (Peter): 4<br>α & β : 12 (8+4) | 3s.m: ▮<br>3s.f: ▮<br>3s.n:<br>3p: ▮▮▮ | Pronouns (PRO) |
| | student: ▮<br>students: ▮▮▮ | Entity types (e-types) |

Figure 11C (5)
- $S_{-1}$: *Mary, who read the most books, kissed Peter.*
- Current sentence ($S_0$): *α & β ran away together and spent all of α.POSS savings.*

Figure 11D (6)
- $S_0$: *α & β ran away together and spent all of α.POSS savings.*
- α & β → *They*
- α → *her*
- $S_0$: *They ran away together and spent all of her savings.*
- All sentences: *Mary, who read the most books, kissed Peter. They ran away together and spent all of her savings.*

Figure 11E (7)
- $S_{-1}$: *Mary, who read the most books, kissed Peter.*
- $S_0$: *α & β +{are characterized as superheroes} ran away together and spent all of α.POSS savings.*
- α & β → *These students*
- α → *her*
- $S_0$: *These students, who are superheroes, ran away together and spent all of her savings.*
- All sentences: *Mary, who read the most books, kissed Peter. These students, who are superheroes, ran away together and spent all of her savings.*

Figure 11F (8)
- $S_x$: Mary who read the most books, kissed Peter
- $S_y$: These students who are superheroes, ran away together and spent all of her savings.
- $S_g$: $\beta$ had 5 costumes, which $\alpha$ advertises on $\alpha \& \beta$.POSS online business.

| κ contextually salient entities | ι Referring terms (R-terms) | |
|---|---|---|
| $\alpha$ (Mary): ▇ + ▇ + ▇ - 16<br>$\beta$ (Peter): ▇ + ▇ - 10<br>$\alpha \& \beta$: ▇ + ▇ - 14 | 3s.m: $\beta$<br>3s.f: $\alpha$<br>3s.n:<br>3p: $\alpha \& \beta$ | Pronouns (PRO) |
| | student: $\alpha$<br>students: $\alpha \& \beta$ | Entity types (e-types) |

- $S_g$: *He* had 5 costumes, which *she* advertises on *their online business*.
- Full text: *Mary, who read the most books, kissed Peter. These students, who are superheroes, ran away together and spent all of her savings. He had 5 costumes, which she advertises on their online business.*

Figure 11G

(g)
- $S_{-3}$: ▓▓ who read the most books, kissed ▓▓
- $S_{-2}$: ▓These students▓ who are superheroes, ran away together and spent all of ▓her▓ savings.
- $S_{-1}$: ▓He▓ had 5 costumes, which ▓she▓ advertises on ▓their online business▓.
- $S_0$: α & β were only making $1K/mo from β.POSS trust fund.

| κ contextually salient entities | λ Referring terms (R-terms) | |
|---|---|---|
| α (Mary) ▓·▓·▓·▓·▓·12<br>β (Peter) ▓·▓·▓·▓·15<br>α & β : ▓·▓·▓·7<br>γ (α & β's online business): ▓ | 3s.m: β<br>3s.f: α<br>3s.n: γ<br>3p: α & β | Pronouns (PRO) |
| | student: β<br>students: α & β<br>online business: γ<br>online businesses: | Entity types (e-types) |

- $S_0$: *They were only making $1K/mo from his trust fund.*
- Full text: *Mary, who read the most books, kissed Peter. These students, who are superheroes, ran away together and spent all of her savings. He had 5 costumes, which she advertises on their online business. They were only making $1K/mo from his trust fund.*

Figure 12

(10)
- $S_1$: *Mary*, who read the most books, kissed *Peter*.
- $S_2$: ▓▓▓▓▓ who are superheroes, ran away together and spent all of ▓ savings.
- $S_3$: ▓ had 5 costumes, which ▓ advertises on ▓▓▓▓▓.
- $S_4$: ▓ were not making enough from ▓▓▓▓.
- $S_5$: In April 2017, $\varepsilon$ donated $10K to $\gamma$ in $\alpha$.POSS name.

| x contextually salient entities | ı Referring terms (R-terms) | |
|---|---|---|
| $\alpha$ (Mary): ▓▓ - 12<br>$\beta$ (Peter): ▓▓ - 16<br>$\alpha$ & $\beta$ : ▓ - 10<br>$\gamma$ : ▓<br>$\delta$ (trust fund): ▓ | 3s.m: $\beta$<br>3s.f: $\alpha$<br>3s.n: $\delta$<br>3p: $\alpha$ & $\beta$ | Pronouns (PRO) |
| | student: $\beta$<br>students: $\alpha$ & $\beta$<br>online business: $\gamma$<br>online businesses:<br>trust fund: $\delta$<br>trust funds: | Entity types (e-types) |

- $S_6$: In April 2017, *Norman* donated $10K to *it* in *her* name.
- Full text: Mary, who read the most books, kissed Peter. These students, who are superheroes, ran away together and spent all of her savings. He had 5 costumes, which she advertises on their online business. They were only making $1K/mo from his trust fund. In April 2017, Norman donated $10K to it in her name.

Figure 13

(11)
- $S_{-5}$: *Mary, who read the most books, kissed Peter.*
- $S_{-4}$: *These students, who are superheroes, ran away together and spent all of her savings.*
- $S_{-3}$: *■ had 5 costumes, which ■ advertises on ■■■.*
- $S_{-2}$: *■ were not making enough from his trust fund.*
- $S_{-1}$: *In April 2017, Norman donated $10K to ■ in ■ name.*
- $S_0$: *β invested $5K into spider silk without telling α.*

| κ contextually salient entities | ι Referring terms (R-terms) | |
|---|---|---|
| α (Mary): ■ - 6<br>β (Peter): ■ - 7<br>α & β : ■<br>γ :<br>δ (trust fund): ■ - 6<br>ε : ■ | 3s.m: ε<br>3s.f: α<br>3s.n: δ<br>3p: α & β | Pronouns (PRO) |
| | student: α<br>students: α & β<br>online business: γ<br>online businesses:<br>trust fund: δ<br>trust funds:<br>investor: ε<br>investors: | Entity types (e-types) |

- $S_0$: *Peter invested $5K into spider silk without telling her.*
- Full text: *Mary, who read the most books, kissed Peter. These students, who are superheroes ran away together and spent all of her savings. He had 5 costumes, which she advertises on their online business. They were only making $1K/mo from his trust fund. In April 2017, Norman donated $10K to it in her name. Peter invested $5K into spider silk without telling her.*

CONTEXT SALIENCY-BASED DEICTIC PARSER FOR NATURAL LANGUAGE GENERATION

CROSS-REFERENCE AND PRIORITY CLAIM TO RELATED PATENT APPLICATIONS

This patent application claims priority to U.S. provisional patent application Ser. No. 62/612,820, filed Jan. 2, 2018, and entitled "Context Saliency-Based Deictic Parser for Natural Language Generation and Natural Language Processing", the entire disclosure of which is incorporated herein by reference.

This patent application is also related to U.S. patent application Ser. No. 16/233,776, filed this same day, and entitled "Context Saliency-Based Deictic Parser for Natural Language Processing", the entire disclosure of which is incorporated herein by reference.

INTRODUCTION

There is an ever-growing need in the art for improved natural language generation (NLG) technology that harnesses computers to process data sets and automatically generate narrative stories about those data sets. NLG is a subfield of artificial intelligence (AI) concerned with technology that produces language as output on the basis of some input information or structure (e.g., where the input constitutes data about a situation to be analyzed and expressed in natural language).

One of the major technical challenges in NLG is computerized control over appropriate usage of pronouns and other context-dependent referential terms in NLG output. The term deixis refers to the inherent ambiguity with respect to words that require additional contextual information in order to fully understanding their meaning. Hence, a word can be characterized as deictic if it has a semantic meaning that is fixed but a denotational meaning that varies depending on its context of usage. Pronouns are classic examples of deictic words, but a wide variety of other terms can be deictic depending on their context. The task of entity referencing in NLG suffers from complexities due to deixis.

A conventional solution in the art for resolving deixis with respect to entity referencing by computers is to block usage of a pronoun to refer to a previous entity if the sentence data includes an intervening entity of the same type as the previous entity between the previous entity reference and the current entity reference for which a pronoun might be used. Accordingly, a computer can be programmed to track entity references in sentences, and block pronoun usage in the event such an intervening entity is detected in the sentence data. An example of such pronoun blockage can be found in the following sentences: "Mary hired Jane. Mary runs the Eastern division." A conventional NLG computer system would process these sentences and find that the entity Jane falls between the first reference to Mary and the second reference to Mary. Because Mary and Jane are both entities of the same type (e.g., a person), the conventional NLG computer system can be programmed to block the usage of a pronoun such as "she" in place of the second reference to Mary.

However, the inventors believe that the conventional approach to entity referencing in NLG systems is overly simplistic and rigid. For example, the inventors believe that in many instances it would be desirable to use pronouns to refer to a previous entity even if there is an intervening entity of the same type. Continuing with the example above, such pronoun usage would result in the following sentence string: "Mary hired Jane. She runs the Eastern division." While this phrasing introduces some ambiguity into who "she" refers to, the inventors note that in many use cases, such ambiguity is tolerable and may even be preferred as better matching up with natural conversational use of language. In order to provide a better and more flexible computerized solution to entity referencing in the NLG arts, the inventors disclose NLG technology that employs a deictic parser to track and quantify the context saliency of entities that are referenced in a window of past sentence data and the uses this context saliency to make decisions about how those entities are referenced in the NLG output (e.g., whether a pronoun or a different referring term should be used in a sentence to describe the subject entity). As an example, context saliency can be quantified based on a grammatical classification of entity terms in the window of sentence data (e.g., classifications as to whether the entity term is being used as the subject of a sentence or an object of the sentence). For example, entity terms classified as subjects can be assigned a higher context saliency score than entity terms classified as objects. The decision-making about usage of referring terms such as pronouns to reference entity terms can then take the context saliency scores for the entity terms into account. As new sentence data is processed, the content of the window of past sentence data can be updated such that the window defines the context of past sentence data for assessing context saliency (e.g., the window can have a defined size where sentence data is moved in and out of the window on a first in first out (FIFO) basis).

In an example embodiment, the inventors disclose a natural language generation method that applies computer technology to sentence data for performing entity referencing, the method comprising: (1) a processor parsing sentence data in a defined window of sentence data, wherein the parsing parses the sentence data into a list of entity terms and a plurality of classifications associated with the listed entity terms, (2) a processor computing a plurality of context saliency scores for a plurality of the listed entity terms based on the classifications associated with the listed entity terms, (3) for new sentence data that refers to an entity term from the entity term list, a processor selecting a referring term for referencing that entity term from a list of candidate referring terms based on the context saliency scores for the entity terms, and (4) a processor forming the new sentence data such that the new sentence data includes the selected referring term to refer to the at least one entity term. The inventors also disclose a corresponding apparatus and computer program product.

As another example embodiment, the inventors disclose a natural language generation apparatus for performing entity referencing on sentence data, the apparatus comprising: (a) a memory configured to store a data structure that comprises (1) a list of entity terms from a sliding window of sentence data, (2) a plurality of context saliency scores associated with the listed entity terms, (3) a list of referring terms, and (4) a plurality of associations between the listed entity terms and the listed referring terms, and (b) a processor configured to (1) analyze the sliding window of the sentence data to parse the sentence data in the sliding window into a plurality of entity terms and a plurality of classifications associated with the entity terms, and (2) based on the analysis, (i) update the entity term list, (ii) compute the context saliency scores for the listed entity terms based on the classifications associated with the listed entity terms, and (iii) update the associations in the data structure between the listed entity terms and the listed referring terms based on the computed context saliency scores, and wherein the processor is further configured to control whether a plurality of entities are referenced in a sentence by an entity term from the entity term list or a referring term from the referring term list based on the associations in the data structure between the listed entity terms and the listed referring terms. The inventors also disclose a corresponding method and computer program product.

The innovative deictic parser disclosed herein can also be applied to natural language processing (NLP) to help an NLP computer system better infer entity references in NLP input data (such as a conversational string). A particular area of NLP that can benefit from the parser disclosed herein is natural language understanding (NLU). NLU is a subfield of AI concerned with technology that draws conclusions on the basis of some input information or structure (e.g., where the input constitutes data about a situation to be analyzed and expressed in natural language, such as a conversational string). A difficult technical challenge in NLU also relates to entity referencing, but in the opposite direction relative to NLG; namely, mapping a context-dependent term that is present in input data to a specific meaning. For example, in a conversational NLU computer system, an input statement might be "Where is she?". The NLU computer system will need to infer who "she" refers to in order to operate properly. The inventors believe that the context saliency tracking capabilities of the deictic parser disclosed herein can be applied to NLU computer systems to help solve the problem of entity referencing in NLU. For example, by tracking the context saliency of various entity terms in a window of past sentence data, the parser can help the NLU computer system understand who "she" refers to in the NLU input.

Thus, in another example embodiment, the inventors disclose a natural language processing method that applies computer technology to sentence data for performing entity referencing, the method comprising: (1) a processor parsing sentence data in a defined window of sentence data, wherein the parsing parses the sentence data into a list of entity terms and a plurality of classifications associated with the listed entity terms, (2) a processor computing a plurality of context saliency scores for a plurality of the listed entity terms based on the classifications associated with the listed entity terms, (3) a processor maintaining a list of referring terms corresponding to the listed entity terms, and (4) for new sentence data that includes a referring term from the referring term list, a processor (i) selecting a corresponding entity term on the entity term list based on the context saliency scores for the entity terms, and (ii) inferring that the referring term in the new sentence data refers to the selected corresponding entity term. The inventors also disclose a corresponding apparatus and computer program product.

In yet another example embodiment, the inventors disclose a natural language processing apparatus for performing entity referencing on sentence data, the apparatus comprising: (1) a memory configured to store a data structure that comprises (i) a list of entity terms from a sliding window of sentence data, (ii) a plurality of context saliency scores associated with the listed entity terms, (iii) a list of referring terms, and (iv) a plurality of associations between the listed entity terms and the listed referring terms, and (2) a processor configured to (i) analyze the sliding window of the sentence data to parse the sentence data in the sliding window into a plurality of entity terms and a plurality of classifications associated with the entity terms, and (ii) based on the analysis, (a) update the entity term list, (b) compute the context saliency scores for the listed entity terms based on the classifications associated with the listed entity terms, and (c) update the associations in the data structure between the listed entity terms and the listed referring terms based on the computed context saliency scores, and wherein the processor is further configured to (i) process an input string that includes a referring term from the referring term list, and (ii) infer an entity term being referenced by the referring term in the input string based on the associations in the data structure between the listed entity terms and the listed referring terms. The inventors also disclose a corresponding method and computer program product.

Through these and other features, example embodiments of the invention provide significant technical advances in the NLG and NLP arts by harnessing computer technology to improve how entities are referenced in NLG output and inferred from NLP input, thereby providing a new and innovative solution to the problem of entity referencing in the NLG and NLP arts that avoids the rigidity of conventional entity referencing solutions in the art.

BRIEF DESCRIPTION OF THE DRAWINGS

FIG. 3 discloses an example of a sliding context window.

FIG. 5B discloses an example decay rule for context saliency scoring within a context window.

FIGS. 5C-5G disclose examples of how context saliency scores can be computed according to a decay function as new sentences are generated.

FIG. 5H disclose additional examples of scoring rules for different example embodiments of entity term classifications.

FIGS. 6A and 6B disclose example process flows for building a referring term list.

FIG. 10 discloses an example referential data structure that be built and maintained by an example embodiment of the deictic parser.

FIGS. 11A-11G show examples of how an example embodiment of the deictic parser can operate with example sentence data.

FIGS. 12-14 show additional examples of how an example embodiment of the deictic parser can operate with additional examples of sentence data.

DETAILED DESCRIPTION OF EXAMPLE EMBODIMENTS

Figure 1:
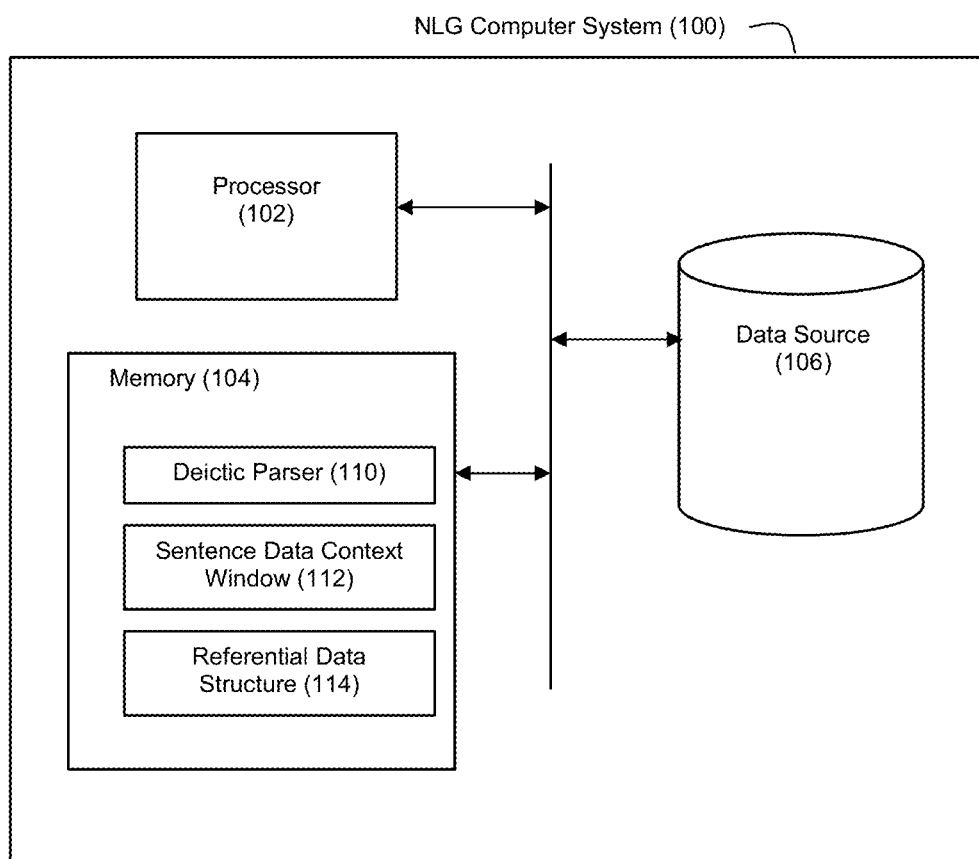
FIG. 1 discloses an example NLG computer system in accordance with an example embodiment.

FIG. 1 shows an example NLG computer system 100 in accordance with an example embodiment. The NLG computer system 100 comprises a processor 102, a memory 104, and a data source 106. The processor 102, memory, 104, and data source 106 can interconnected with each other in any of a variety of manners (e.g., via a bus, via a network, etc.) It should be understood that the NLG computer system 100 may include additional or different components if desired by a practitioner.

The processor 102 may comprise one or more processors such as general-purpose processors (e.g., a single-core or multi-core microprocessor), special-purpose processors (e.g., an application-specific integrated circuit or digital-signal processor), programmable-logic devices (e.g., a field programmable gate array), etc. that are suitable for carrying out the operations described herein.

The memory 104 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory 104 may also be integrated in whole or in part with other components of the system 100. Further, the memory 104 may be local to the processor 102, although it should be understood that the memory 104 (or portions of memory 104) could be remote from the processor 102, in which case the processor 102 may access such remote memory through a network interface.

Memory 104 may store software programs or instructions that are executed by processor 102 during operation of the system 100. For example, the memory 104 may store the deictic parser 110, which can take the form of a plurality of instructions configured for execution by processor 102 for tracking the context saliency of entity terms in sentence data. The memory 104 may also store a sentence data context window 112, which can take the form of a repository of sentence data for consideration by the deictic parser 110. The memory 104 may also store a referential data structure 114 for use by the deictic parser 110 when performing entity referencing on sentence data. The referential data structure 114 may comprise data representing a plurality of entity terms, a plurality of referring terms, and a plurality of associations between the entity terms and the referring terms. The referential data structure 114 can provide a context saliency tracking function for the parser 110 by storing quantifications of context saliency for various entities referenced in the sentence data. It should also be understood that the sentence data context window 112 need not be a separate repository in the memory 104; for example, the context window 112 could be a virtual context window that is defined by the tracking function of the referential data structure 114.

The data source 106 can be a source of data for analysis by the NLG computer system when generating NLG output. This data source can be any source of data, such as one or more databases, file systems, computer networks, etc.

An example of an NLG computer system 100 that can employ the deictic parser 110 is the QUILL™ narrative generation platform from Narrative Science Inc. of Chicago, Ill. Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, 9,396,168, 9,576,009, 9,697,198, 9,697,492, 9,720,884, 9,720,899, and 9,977,773; and U.S. patent application Ser. No. 14/211,444 (entitled "Method and System for Configuring Automatic Generation of Narratives from Data", filed Mar. 14, 2014), Ser. No. 15/253,385 (entitled "Applied Artificial Intelligence Technology for Using Narrative Analytics to Automatically Generate Narratives from Visualization Data, filed Aug. 31, 2016), 62/382,063 (entitled "Applied Artificial Intelligence Technology for Interactively Using Narrative Analytics to Focus and Control Visualizations of Data", filed Aug. 31, 2016), Ser. No. 15/666,151 (entitled "Applied Artificial Intelligence Technology for Interactively Using Narrative Analytics to Focus and Control Visualizations of Data", filed Aug. 1, 2017), 62/458,460 (entitled "Interactive and Conversational Data Exploration", filed Feb. 13, 2017), Ser. No. 15/895,800 (entitled "Interactive and Conversational Data Exploration", filed Feb. 13, 2018), 62/460,349 (entitled "Applied Artificial Intelligence Technology for Performing Natural Language Generation (NLG) Using Composable Communication Goals and Ontologies to Generate Narrative Stories", filed Feb. 17, 2017), Ser. No. 15/897,331 (entitled "Applied Artificial Intelligence Technology for Performing Natural Language Generation (NLG) Using Composable Communication Goals and Ontologies to Generate Narrative Stories", filed Feb. 15, 2018), Ser. No. 15/897,350 (entitled "Applied Artificial Intelligence Technology for Determining and Mapping Data Requirements for Narrative Stories to Support Natural Language Generation (NLG) Using Composable Communication Goals", filed Feb. 15, 2018), Ser. No. 15/897,359 (entitled "Applied Artificial Intelligence Technology for Story Outline Formation Using Composable Communication Goals to Support Natural Language Generation (NLG)", filed Feb. 15, 2018), Ser. No. 15/897,364 (entitled "Applied Artificial Intelligence Technology for Runtime Computation of Story Outlines to Support Natural Language Generation (NLG)", filed Feb. 15, 2018), Ser. No. 15/897,373 (entitled "Applied Artificial Intelligence Technology for Ontology Building to Support Natural Language Generation (NLG) Using Composable Communication Goals", filed Feb. 15, 2018), Ser. No. 15/897,381 (entitled "Applied Artificial Intelligence Technology for Interactive Story Editing to Support Natural Language Generation (NLG)", filed Feb. 15, 2018), 62/539,832 (entitled "Applied Artificial Intelligence Technology for Narrative Generation Based on Analysis Communication Goals", filed Aug. 1, 2017), Ser. No. 16/047,800 (entitled "Applied Artificial Intelligence Technology for Narrative Generation Based on Analysis Communication Goals", filed Jul. 27, 2018), Ser. No. 16/047,837 (entitled "Applied Artificial Intelligence Technology for Narrative Generation Based on a Conditional Outcome Framework", filed Jul. 27, 2018), 62/585,809 (entitled "Applied Artificial Intelligence Technology for Narrative Generation Based on Smart Attributes and Explanation Communication Goals", filed Nov. 14, 2017), 62/618,249 (entitled "Applied Artificial Intelligence Technology for Narrative Generation Using an Invocable Analysis Service", filed Jan. 17, 2018), 62/632,017 (entitled "Applied Artificial Intelligence Technology for Conversational Inferencing and Interactive Natural Language Generation", filed Feb. 19, 2018), and 62/691,197 (entitled "Applied Artificial Intelligence for Using Natural Language Processing to Train a Natural Language Generation System", filed Jun. 28, 2018); the entire disclosures of each of which are incorporated herein by reference. However, it should be understood that the deictic parser 110 can be employed with other NLG computer systems that have a need to perform entity referencing on sentence data.

Figure 2:
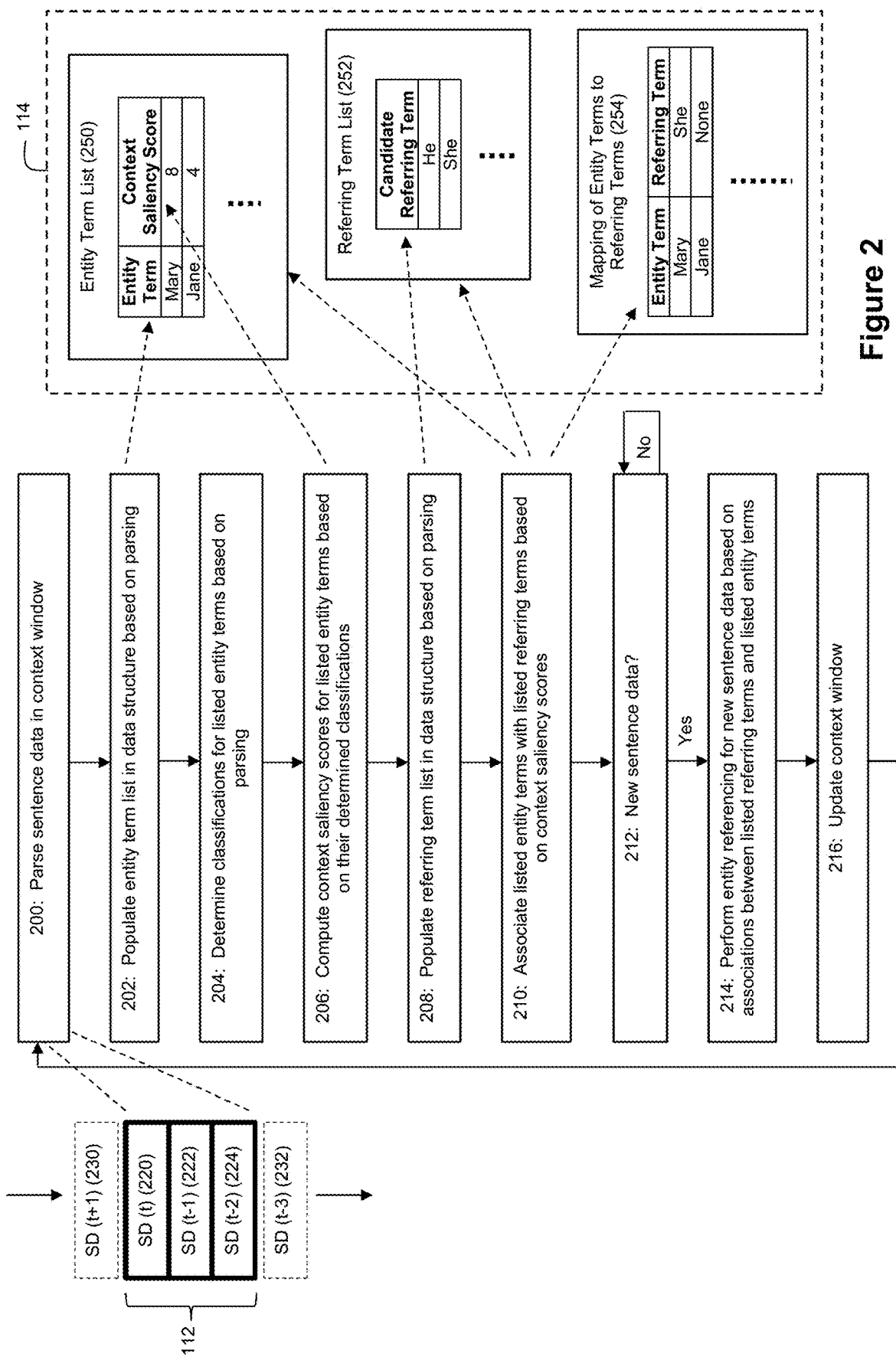
FIG. 2 discloses an example process flow for an example embodiment of a deictic parser.

FIG. 2 depicts an example process flow for the deictic parser 110. At step 200, a processor parses sentence data in a context window 112. As shown in FIG. 2, the context window 112 can have a size that holds some number of prior sentence data (e.g., 3 intervals of sentence data for t, t–1, and t–2 as shown in FIG. 2). The size of the context window can be fixed, or it can be defined in response to user input. For example, a practitioner might find that in some instances, a size n of 3 intervals performs well with respect to producing highly understandable entity references in the NLG output; but in other instances of size n of 5 intervals works better. The sentence data in the context window 112 can be discrete sentences that had previously been generated by the NLG computer system 100 where the intervals are defined by the sentence boundaries, although this need not necessarily be the case. For example, the sentence data can instead be a defined string of words of NLG output, where the intervals are defined by boundaries between clauses.

The context window 112 can be a sliding context window whose population of sentence data changes over time as new sentence data is processed. FIG. 3 depicts an example of the sliding nature of a context window 112 for an example narrative with six sentences (where the size n of the context window is three sentences). In this case, when Sentence 4 is being generated, the context window 112 would include Sentences 1-3. Then, when Sentence 5 is being generated, the context window 112 would include Sentences 2-4 (and Sentence 1 would no longer be in the context window). Next, when Sentence 6 is being generated, the context window 112 would include Sentences 3-5 (and Sentences 1-2 would no longer be in the context window).

The sentence data may comprise data that represents a plurality of words or ideas that are to be expressed in a sentence. The sentence data may also comprise metadata about the words or ideas that are to be expressed in a sentence. For example, the sentence data may include an identifier for one or more grammatical parts of the sentence (e.g., the name of the subject (such as "Mary"), a token that indirectly represents the name of the subject (e.g., a pointer to an entity in an ontology), etc.), and this identifier may include metadata about the sentence parts (e.g., data that identifies an entity type for the subject, etc.). Thus, in an example embodiment with respect to narrative generation system such as that disclosed in the above-referenced and incorporated 62/585,809 patent application, the sentence data may exhibit a structure that shows the grammatical relationships between the words in a sentence (e.g., part of speech, constituency, grammatical role). Each word can be tagged with an ontological element that it is associated with. For example, in the sentence "Mary visited John", the words "Mary" and "John" can be marked in the sentence data as nouns and "visited" could be marked in the sentence data as a verb, where "Mary" is further marked as the subject and "John" is further marked as the direct object. "May" could point to an ontological element for the entity "Mary Jones" who is a "person", and, likewise, "John" could point to the ontological element for the entity "John Smith". The word "visited" can point to a relationship in the ontology for "visiting", which occurs between two entities. The entire clause can point to an idea produced by the system that Mary is visiting John. If there were another relative clause in the sentence data (e.g., the relative clause of "who is from Chicago" in the sentence "Mary, who is from Chicago, visited John"), then this relative clause could point to another idea produced by the system (e.g., an idea that Mary is from Chicago in this example).

Figure 4:
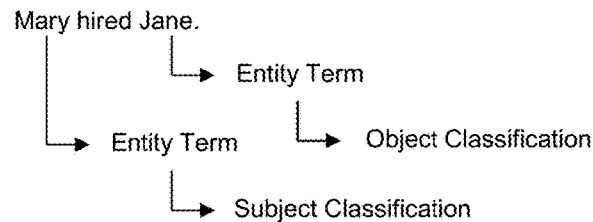
FIG. 4 discloses an example of how sentence data can be parsed to identify entity terms and associated classifications.

The parsing operation at step 200 can analyze the sentence data in the context window 112 to identify entity terms in the sentence data and determine classifications for the identified entity terms (e.g, grammatical classifications such as whether the entity term is used as the subject or as an object in the sentence data). In some instances, the sentence data may arrive at the parser 110 with metadata that tags various objects as entity terms and identifies their corresponding classifications. However, in other embodiments, the sentence data may arrive at the processor as a string of words without accompanying metadata. If so, step 200 can apply techniques such as named entity recognition (NER) (for example, the "Stanford Named Entity Recognizer (NER)" available from the Stanford Natural Language Processing Group) and dependency parsing or constituency parsing (for example, the "Stanford Parser" available from the Stanford Natural Language Processing Group) to the sentence data to parse the sentence data into entity terms and classifications. FIG. 4 shows an example of parsing the simple sentence "Mary hired Jane." The parsing of this sentence can identify "Mary" and "Jane" as entity terms and also determine that "Mary" can be classified as the subject of the sentence while "Jane" can be classified as the object of the sentence.

At step 202, a processor populates an entity term list 250 in data structure 114 with the entity term(s) identified at step 200. For example, as shown in FIG. 2, the entity term list 250 can include entries for "Mary" and "Jane" with respect to the example sentence of FIG. 4.

At step 204, a processor determines the classifications for the entity terms as a result of the parsing at step 200. Referring once again to FIG. 4, these classifications may be grammatical classifications such as a subject classification and an object classification. However, it should be understood that other classifications could be employed if desired by a practitioner.

For example, scoring can vary based on whether entity terms are embedded in relative clauses or main clauses of a sentence. In such an embodiment, a sentence such as "Jill, who married Jack, actually loves Mark" can be scored such that Mark (who is in the main clause) is deemed more salient than Jack (who is in the relative clause).

As another example, the classifications could identify which terms are present in the left periphery of a sentence (beginning portion) versus the right periphery of a sentence (end portion) based on a rationale that, in the English language, topical items tend to get mentioned in the left edge of a sentence. In such a classification system, terms that are classified as being present in the left periphery could be scored higher than terms that are classified as being present in the right periphery.

As yet another example, the classifications could be based on recency such that terms that are most recent in sentence get scored higher than terms that are less recent. This arrangement which provides greater scoring weight to terms in the right periphery of a sentence effectively has the opposite effect of the classification/scoring example above (where greater scoring weight is provided to terms in the left periphery of a sentence). Accordingly, in scenarios where a practitioner believes that recency will have a significant impact on context saliency, this approach may be beneficial.

As yet another example, the classifications can leverage runtime context data relating to the sentence data to impact context saliency. For example, to track context for temporal terms, the parser can leverage current date/time knowledge by the system at runtime when the sentence data is being processed, and this information can be used to influence when referring terms such as "now" and "then" are used. Similarly, if the sentence data runtime metadata includes geospatial information for the system at runtime, this runtime context data can be used to track context saliency with respect to referring terms such as "here" and "there". Also, if the runtime context data tracks who the NLG outputs are going to or being read by, this information can be used to pre-boost the saliency of referring terms such as $1^{st}$ and $2^{nd}$ person pronouns ("I", "you"). Further still, the runtime context data may know that a global entity is involved in the NLG process. For example, if reports are being generated about sales by Ford, this runtime context data can be used to boost the saliency of Ford (so that a referring term such as "company" may be linked or even pre-linked to Ford).

At step 206, a processor computes context saliency scores for the entity terms on the entity term list 250 based on their determined classifications. The context saliency score is a measure of how salient a given entity term is with respect to the content of the narrative resulting from the sentence data in the context window 112. For example, if there are three sentences in the context window 112, and Mary is the subject of each sentence, then Mary is likely the most salient entity term in the context of the narrative defined by the context window 112. Accordingly, the context saliency score for Mary should be higher than the context saliency for another entity term that is only mentioned in passing within the context window (e.g., where Jane is mentioned as an object in one of the three sentences). Accordingly, it should be understood that step 206 can employ a metric for computing the context saliency of the entity terms in the sentence data of the context window 112. Examples of how context saliency scores can be computed are described with reference FIGS. 5A-5H discussed below. However, it should be understood that other techniques could be applied for computing context saliency scores.

Figure 5A:
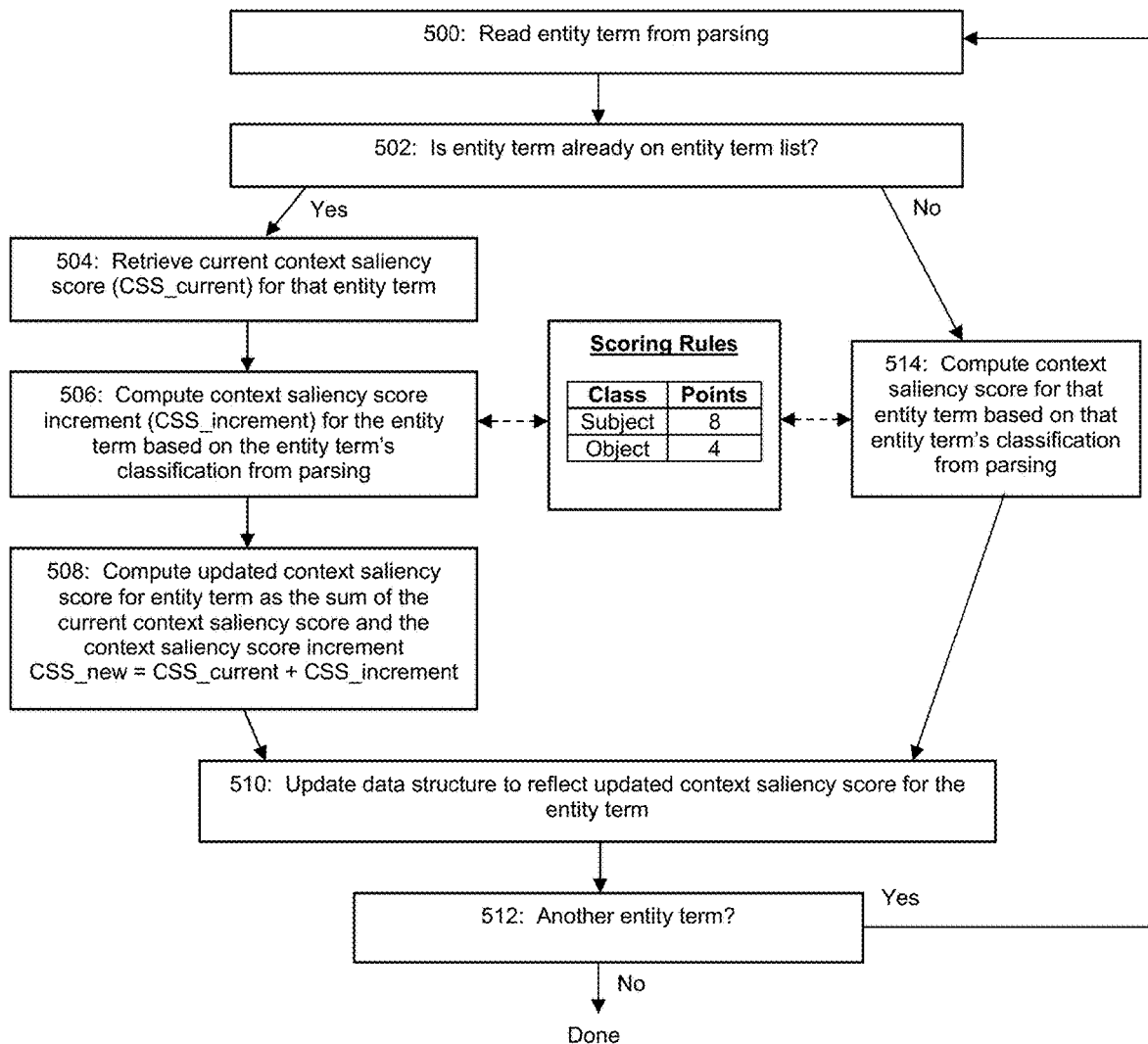
FIG. 5A discloses an example process flow for scoring the context saliency of an entity term.

The example of FIG. 5A shows how step 206 can be performed in an example where scoring rules are employed such that an entity term with a subject classification is awarded 8 points and an entity term with an object classification is awarded 4 points. It should be understood that these point values are examples only, and a practitioner is free to choose any other scoring scale that the practitioner believes is appropriate for a given use case. At step 500, a processor reads an entity term that was found as a result of the parsing step. At step 502, a processor checks whether this entity term was already on the entity term list 250.

If the entity term is already on the entity term list 250, this means that a context saliency score may have been previously computed for that entity term (e.g., when processing the prior sentence in the context window). Accordingly, at step 504, a processor retrieves the current context saliency score for the entity term (CSS_current). Next, at step 506, a processor computes a context saliency score increment for the entity term (CSS_increment) based on the entity term's classification from the parsing step. In this example, (1) if the entity term was classified as a subject, then the CSS_increment would be 8 points, and (2) if the entity term was classified as an object, then the CSS_increment would be 4 points. At step 508, a processor computes an updated context saliency score for the entity term as the sum of CSS_current and CSS_increment. Thereafter, the data structure 114 (e.g., entity term list 250) can be updated to reflect the updated context saliency score for the entity term (step 510).

If the entity term is not already on the entity term list 250, this means that the score computation need not take into consideration a pre-existing context saliency score for the entity term. Accordingly, at step 514, a processor computes a context saliency score for the entity term (CSS_increment) based on the entity term's classification from the parsing step. In this example, (1) if the entity term was classified as a subject, then the context saliency score would be 8 points, and (2) if the entity term was classified as an object, then the context saliency score would be 4 points. Thereafter, step 510 is performed to update the data structure 114 (e.g., entity term list 250) to reflect the computed context saliency score for the entity term.

At step 512, a processor determines if there is another entity term that was found as a result of the parsing step. If yes, the process flow can return to step 500. Otherwise, the scoring process can be concluded.

The inventors note that a practitioner might find it desirable to have context saliency scores decay after each sentence data interval based on the notion that immediacy can play a strong role in saliency. Accordingly, more recent sentences in the context window should get more weight in terms of impacting context saliency than older sentences in the context window. Thus, in an example embodiment, the scoring process can also employ a decay function for adjusting the context saliency scores for entity terms after each sentence data interval. FIG. 5B describes an example decay function for scoring where context saliency scores decay by 50% each sentence data interval. It should be understood that different decay functions could be employed by a practitioner if desired, including linear decays that employ decay percentages other than 50%, non-linear decays, etc.

Also, in example embodiments where a decay function is employed, the decay function can serve as an indirect control on the size of the context window. Thus, rather than defining the context window size directly via a size parameter, the size of the context window can be defined indirectly via the scoring rules. In an example where the scoring rules provide subjects with 8 points and objects with 4 points, and where scores decay by 50% each sentence data interval (and where scores less than 1 are rounded down to zero), this means that subjects will have a context window size of 4 sentence data intervals (scores of 8, 4, 2, and 1 before decaying down to zero) and objects will have a context window size of 3 sentence data intervals (scores of 4, 2, and 1 before decaying down to zero).

FIGS. 5C-5G show examples of how context saliency scores can be computed according to a decay function as new sentences are generated. In FIG. 5C, as a first sentence is parsed, a conclusion is reached that Entity Term 1 is a subject and Entity Term 2 is an object, thereby resulting in context saliency scores of 8 and 4, respectively, for Entity Terms 1 and 2. FIG. 5D shows how these scores decay at the next sentence data interval. For the t−1 interval, the scores for Entity Terms 1 and 2 are reduced to 4 and 2 respectively. The newly parsed entity terms are Entity Terms 2 and 3, and they are scored according to their classifications (8 points for Entity Term 3 and 4 points for Entity Term 2).

FIG. 5E shows scoring for the next sentence data interval. Once again, the prior scores decay by 50% for the t−1 and t−2 intervals. The current sentence data now includes Entity Terms 1 and 2, and they are scored according to their classifications. The overall context saliency scores for each entity term is then the sum of the context saliency scores for the subject entity term for each interval in the context window. In this example, it can be seen that the most salient entity after three sentence intervals is Entity Term 1.

FIG. 5F shows the further progression where the context window now includes the t−1, t−2, and t−3 intervals (in addition to the current sentence data). In this case, it can be seen that the score for Entity Term 4 in interval t−3 has decayed down to zero and thus the reference to Entity Term 4 in the t−3 sentence no longer influences context saliency scoring.

FIG. 5G shows the next progression where the context window now includes the t−1, t−2, t−3, and t−4 intervals (in addition to the current sentence data). In this case, it can be seen that the score for Entity Term 2 in interval t−3 has decayed down to zero as have the scores for Entity Terms 1 and 4 in interval t−4.

Thus, FIGS. 5C-5G show how the parser 110 can track context saliency for entity terms in sentence data over time with respect to a sliding context window of sentence data.

While the example scoring rules used by FIGS. 5A-5G are relatively simply based on two classifications (subject versus object), it should be understood that additional classifications can be employed by the parsing and the scoring rules. For example, objects can be further distinguished based on whether they are direct objects, indirect objects, and/or oblique objects. The scoring rules can be defined such that direct objects get more weight than indirect or oblique objects. In the example sentence "Mary hired Jane", the entity term "Jane" serves as a direct object. In the example sentence "Mary sent a package to Jane", the entity term "Jane" serves as an indirect object. In the example sentence "Mary sent a package to Chicago for Jane", the entity term "Jane" serves as an oblique object. Oblique objects can sometimes also be referred to as prepositional objects. FIG. 5H shows an example where subjects get more weight than direct objects and where direct objects get more weight than indirect objects (see the leftmost set of rules in FIG. 5H). FIG. 5H also shows an example where subjects get more weight than direct objects and where direct objects get more weight than oblique objects (see the middle set of rules in FIG. 5H). FIG. 5H shows another example where subjects get more weight than direct objects, where direct objects get more weight than indirect objects, and where indirect objects get more weight than oblique objects (see the rightmost set of rules in FIG. 5H).

Returning to FIG. 2, at step 208, a processor populates a referring term list 252 in the data structure 114 based on the parsing. For example, if the parsing detects an entity term that is a feminine singular, step 208 can add a feminine singular pronoun (e.g., "she") to the referring term list 252 as a candidate referring term. Similarly, if the parsing detects an entity term that is a masculine singular, step 208 can add a masculine singular pronoun (e.g., "he") to the referring term list 252 as a candidate referring term. Candidate referring terms are terms that may be used by the NLG system to refer to entity term in NLG output in place of the direct name for the entity term (e.g., using "she" instead of "Mary"). The inventors further note that a practitioner may choose to pre-populate the referring term list 252 with a range of known pronouns (or other known referring terms that the system may have prior knowledge as being potentially described in NLG output) which may obviate the need for step 208 in some situations.

FIG. 6A depicts an example process flow for step 208. In the example of FIG. 6A, pronouns serve as the candidate referring terms. At step 600, a processor reads an entity term from the parsing. At step 602, a processor determines one or more suitable pronouns for the entity term (e.g., "she" for a singular feminine entity term, "he" for a singular masculine entity term, "it" for a non-gendered entity term (or for a gendered entity term if appropriate)). At step 604, a processor adds the pronoun(s) determined at step 602 to the referring term list 252. Then, a processor can check whether there is another entity term to consider as a result of the processing (step 606). If so, the process flow returns to step 600. Otherwise, the process flow can conclude.

Figure 6B:
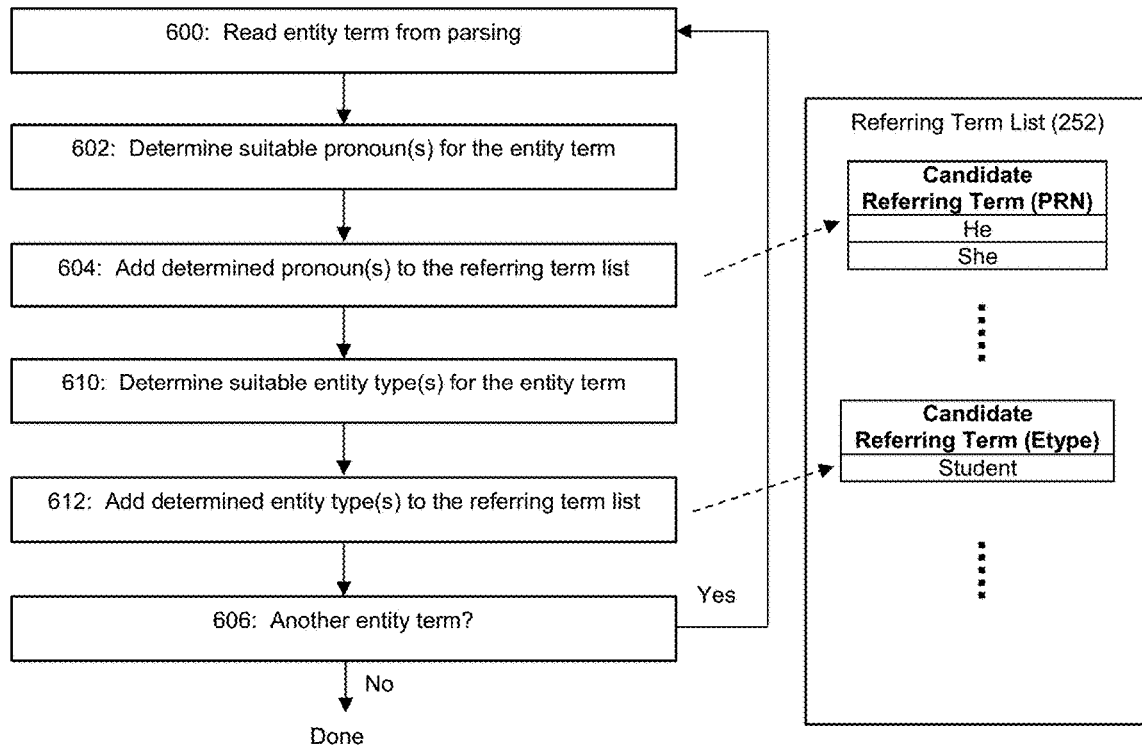

FIG. 6B depicts another example process flow for step 208. In the example of FIG. 6A, entity types can also serve as the candidate referring terms (in addition to pronouns). For example, if the entity terms "Mary" and "Jane" both have an entity type of "student", then "student" can also serve as a candidate referring term. In FIG. 6B, steps 600-604 can proceed as they are described above with reference to FIG. 6A to add suitable pronouns to the referring term list 252. At step 610, a processor also determines one or more suitable entity type(s) for the subject entity term. As explained below, this determination can be made with reference to an ontology maintained by the NLG computer system 100. At step 612, a processor adds the entity type(s) determined at step 610 to the referring term list 252. Then, a processor can perform step 606 as discussed above. Thus, it can be seen that the process flow of FIG. 6B produces a referring term list 252 with two types of candidate referring terms—pronouns (e.g., he, she) and entity types (e.g., student).

Figure 6C:
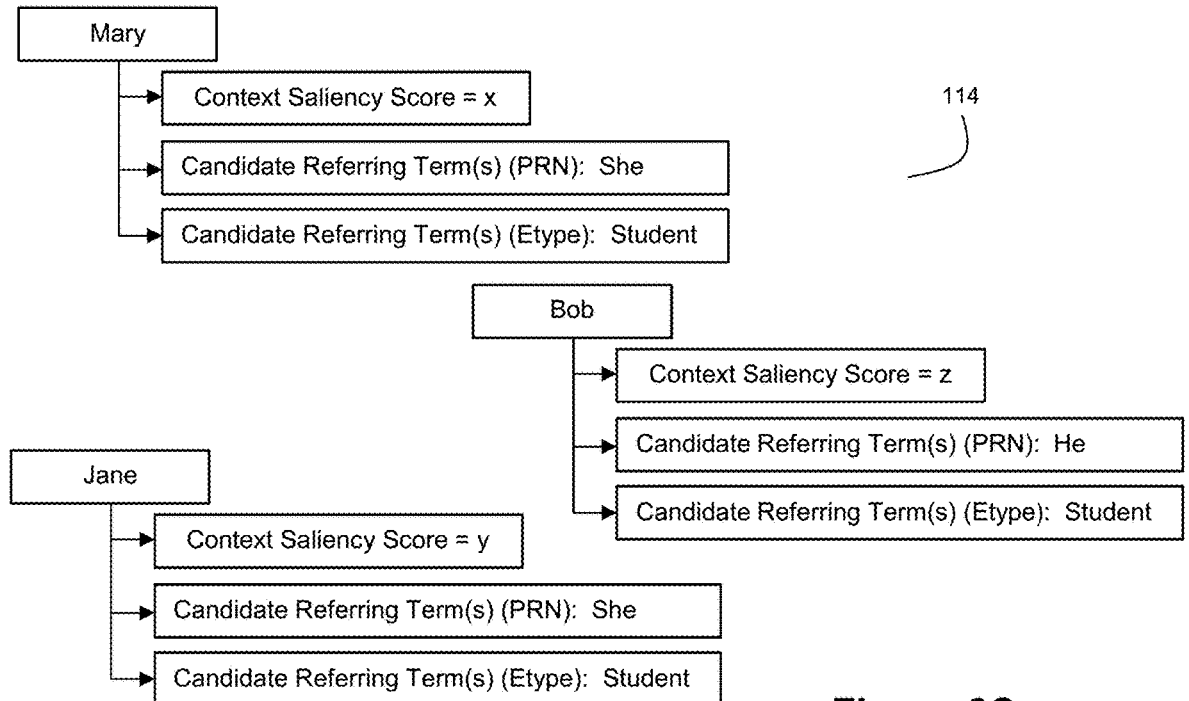
FIG. 6C discloses an example embodiment of data structure comprising a plurality of entity terms with associated context saliency scores and candidate referring terms.

While the entity term list 250 and referring term list 252 are shown in figures discussed above as separate lists for ease of illustration, it should be understood that the content of these lists can be stored in alternate data structures if desired by a practitioner. For example, the data structure 114 can associate various forms of metadata with an entity term such as the entity term's context saliency score and any candidate referring terms that were found suitable for that entity term at step 208. FIG. 6C shows an example where the "Mary" entity term is associated with (1) a context saliency score of "x", (2) a candidate referring term (pronoun) of "she", and (3) a candidate referring term (entity type) of "student". FIG. 6C also shows that the "Jane" entity term is associated with (1) a context saliency score of "y", (2) a candidate referring term (pronoun) of "she", and (3) a candidate referring term (entity type) of "student". FIG. 6C further shows that the "Bob" entity term is associated with (1) a context saliency score of "z", (2) a candidate referring term (pronoun) of "he", and (3) a candidate referring term (entity type) of "student". The example of FIG. 6C, where candidate referring terms are also associated with entity terms rather than being listed on referring term list 252 separate from their compatible entity terms, can permit more efficient mapping of referring terms to entity terms at subsequent steps of the process.

Figure 6D:
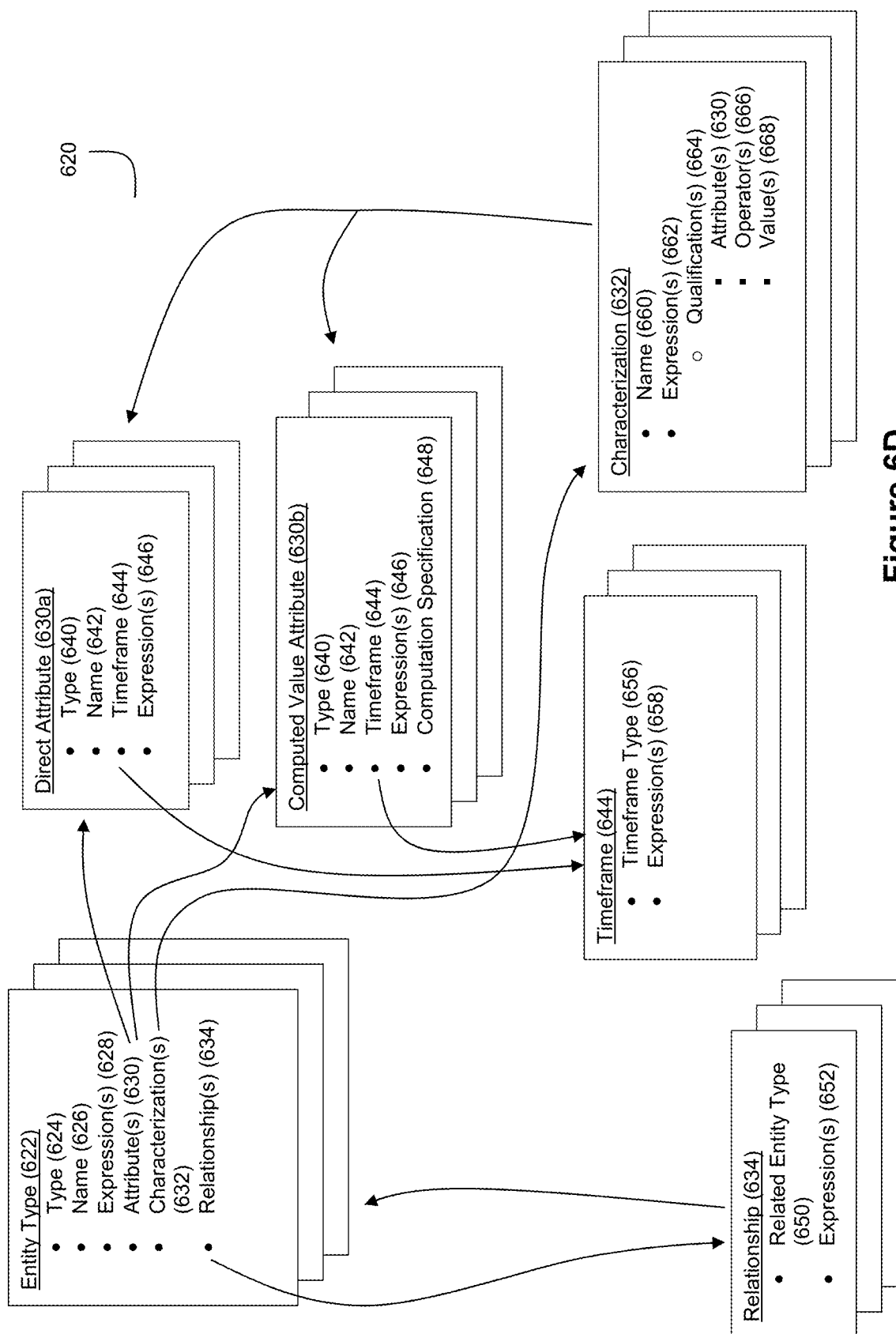
FIG. 6D discloses an example ontology data structure which can be accessed to determine candidate referring terms for an entity term.

FIG. 6D shows an example ontology data structure 620 that can be consulted by a processor at step 610 to determine a suitable entity type for an entity term. As described in the above-referenced and incorporated 62/460,349, 62/539,832, and 62/585,809 patent applications, an NLG computer system 100 can build and use such an ontology 620 when generating narratives about data. However, it should be understood that other ontologies could be used to provide a knowledgebase for the parser 110.

The ontology 620 may comprise one or more entity types 622 that correspond to the entity terms in the sentence data. Each entity type 622 is a data structure associated with an entity type and comprises data that describes the associated entity type. Examples of entity types 622 would be a "student", "salesperson" or a "city". Each entity type 622 comprises metadata that describes the subject entity type such as a type 624 (to identify whether the subject entity type is, e.g., a person, place or thing) and a name 626 (e.g., "salesperson", "city", etc.). Each entity type 622 also comprises one or more attributes 630. For example, an attribute 630 of a "salesperson" might be the "sales" achieved by a salesperson. Additional attributes of a salesperson might be the salesperson's gender and sales territory.

Attributes 630 can be represented by their own data structures within the ontology and can take the form of a direct attribute 630a and a computed value attribute 630b. Attributes 630a/630b may comprise metadata such as an attribute type 640, attribute name 642, attribute timeframe 644, attribute expression 646, and attribute computation specification 648, as discussed in greater detail in the above-referenced and incorporated patent applications.

Each entity type 622 may also comprise one or more characterizations 632. For example, a characterization 632 of a "salesperson" might be a characterization of how well the salesperson has performed in terms of sales (e.g., a good performer, an average performer, a poor performer). Characterizations can be represented by their own data structures 632 within the ontology, and they may comprise metadata such as a name 660, expression 662, qualifications 664 (which may include attribute(s) 630, operator(s) 666, and value(s) 668, as discussed in greater detail in the above-referenced and incorporated patent applications.

Each entity type 622 may also comprise one or more relationships 634. Relationships 634 are a way of identifying that a relationship exists between different entity types and defining how those different entity types relate to each other. Relationships can be represented by their own data structures 634 within the ontology. A relationship 634 can include metadata such as the related entity type 650 with respect to the subject entity type 622 and expression(s) 652, as discussed in greater detail in the above-referenced and incorporated patent applications.

The entity type 622 can be tied to one or more expressions 628. When the NLG system determines that the subject entity type needs to be described in narrative text, the system can access the expression(s) 628 associated with the subject entity type to determine how that entity type will be expressed in the narrative text. The expression(s) 628 can be a generic expression for the entity type 622 (e.g., the name 626 for the entity type, such as the name "salesperson" for a salesperson entity type), but it should be understood that the expression(s) 628 may also or alternatively include alternate generic names (e.g., "sales associate"). Thus, the expression(s) 628 can be read at step 610 to determine a suitable candidate referring term for an entity term that qualifies as an instance of entity type 622. As an example where the entity term is "Mary" and "Mary" is a "student" entity type 622, the "student" entity type 622 may include the following expressions 628: student, pupil. Step 610 can result in "student" and "pupil" being added to list 252 as candidate referring terms.

Another ontological object can be a timeframe 644. In the example of FIG. 6D, timeframes 644 can be tied to direct attributes 630a and/or computed value attributes 630b. The timeframe 644 may comprise a timeframe type 656 (e.g., year, month, quarter, hour, etc.) and one or more expressions(s) 658 that control how the subject timeframe would be described in resultant narrative text.

Returning to FIG. 2, at step 210, a processor associates listed entity terms with listed referring terms based on the context saliency scores associated with the entity terms. This association step can produce a mapping structure 254 that identifies a chosen referring term a corresponding entity term from the entity term list 250. It should be noted that some entity terms on the entity term list will likely not have an associated referring term (because the context saliency scores did not justify selecting a candidate referring term for use as a referring term). In the example of FIG. 2, the referring term "she" has been mapped to "Mary", while "Jane" does not have a referring term mapped thereto. The mapping at step 210 can be performed in a number of ways depending upon the desires of a practitioner. FIGS. 7A-7D show several examples of how step 210 can be carried out.

Figure 7A:
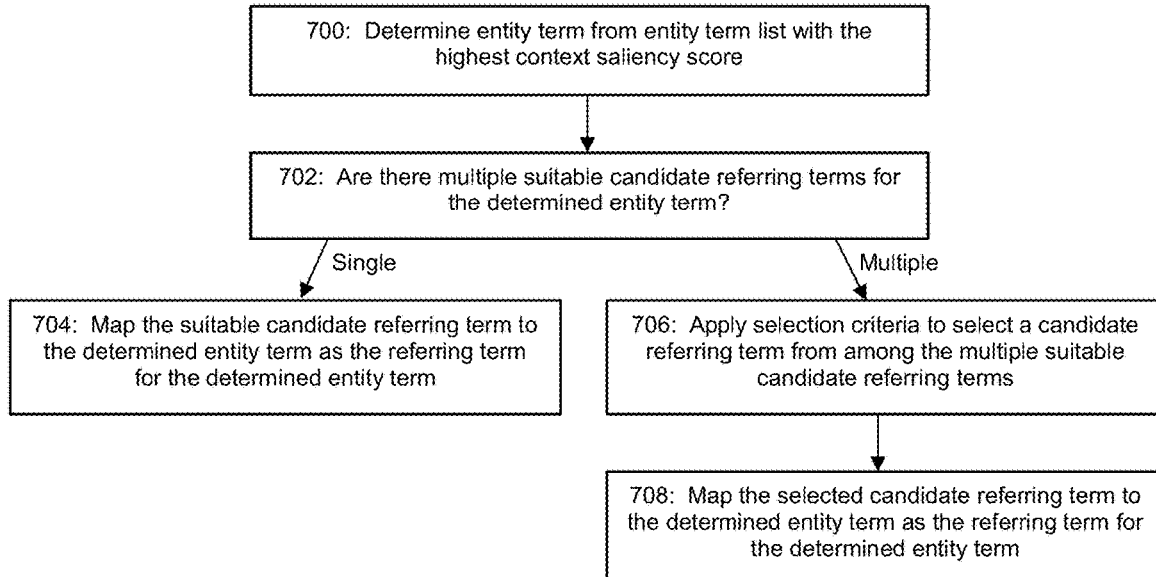
FIGS. 7A-7D disclose example process flows for mapping referring terms to entity terms based on context saliency.
Figure 7B:
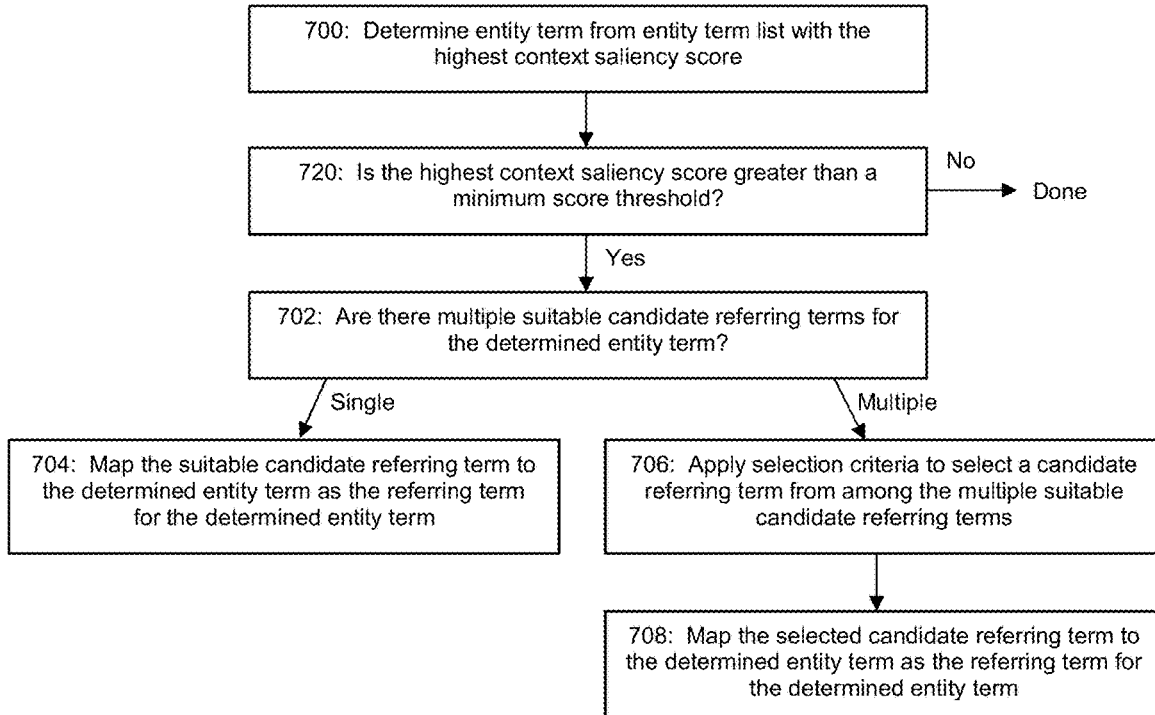
Figure 7C:
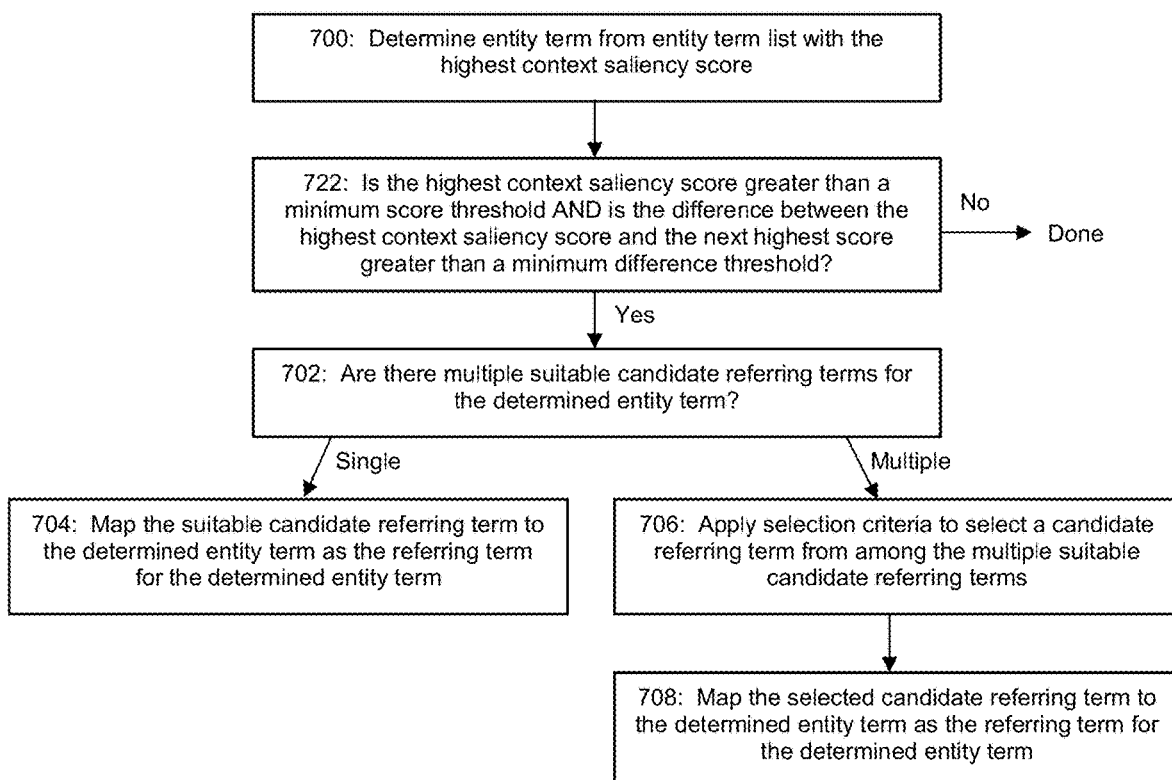

The example of FIG. 7A shows an example where referring terms are mapped to the suitable entity term having the highest context saliency score. At step 700, a processor determines the entity term from the entity term list 250 with the highest associated context saliency score. Next, at step 702, a processor identifies one or more suitable candidate referring terms from the referring term list 252 for the entity term with the highest context saliency score and determines if there are multiple such suitable candidate referring terms for use to describe that entity term. Suitability for candidate referring terms can be based on criteria in addition to context saliency scores. For example, a processor can check whether a candidate referring term is a valid referent for the entity term with respect to grammatical rules. For example, person/number/gender (PNG) criteria can be used to determine whether a pronoun is valid for a given entity term (e.g., requiring that the pronoun for "Mary" be a third person singular, feminine pronoun ("she"). Any combination of these PNG criteria can be used at step 704 to find suitable candidate referring terms for an entity term. Moreover, if a data structure such as that shown by FIG. 6C is employed by the parser 110, then the suitable candidate referring terms with respect to an entity term may already be associated with the entity term. Also, it should be understood that, in some embodiments, there may be multiple suitable candidate referring terms if the candidate referring terms include pronouns and entity types (e.g., where "she" and "student" may be suitable candidate referring terms for "Mary").

If only a single candidate referring term is found at step 702, then the process flow proceeds to step 704 where the single suitable candidate referring term is mapped to the entity term with the highest context saliency score (see mapping structure 254 in FIG. 2).

If multiple candidate referring terms are found at step 702, then the process flow proceeds to step 706 where a processor applies selection criteria to the suitable candidate referring terms to select a candidate referring term from among the multiple candidate referring terms. The selection criteria can be any of a number of criteria. For example, the selection criteria can favor pronouns over entity types. As another example, the selection criteria could evaluate other aspects of the parsed sentence data to determine which candidate referring term might serve as the better entity reference. For example, if the sentence data introduces a new fact into the narrative, it may be desirable to use the entity type rather than the pronoun (an example of this is discussed below). Next, at step 708, the selected suitable candidate referring term is mapped to the entity term with the highest context saliency score (see mapping structure 254 in FIG. 2).

The inventors note that a practitioner may find it desirable to require that an entity term have a minimum context saliency score before a referring term can be used in the NLG output to refer to that entity term. For example, if the highest scoring entity term corresponds to an entity term that was used as an indirect object in a sentence that came two sentences before the current sentence, it may be desirable to suppress the use of a referring term to describe that entity term in the next sentence in order to avoid confusion. To implement such control, the example of FIG. 7B employs step 720 which enforces a minimum score threshold on the mapping of referring terms to entity terms. The minimum score threshold can be selected to be a value as desired by a practitioner, and it may be defined in response to user input.

The inventors further note that a practitioner may find it desirable to require that the highest scoring entity term have a difference in context saliency scores with respect to the next highest scoring entity term that is greater than a defined difference threshold before a referring term can be used in the NLG output to refer to that entity term. For example, if the highest scoring entity term corresponds to an entity term with a score of 4 and the next highest scoring entity term has a score of 3, there may not be a sufficient difference in saliency to clearly understand which entity term is being referenced by a referring term. In such a case, it may be desirable to suppress the use of a referring term to describe that entity term in the next sentence in order to avoid confusion. To implement such control, the example of FIG. 7C employs step 722 which enforces not just the minimum score threshold from FIG. 7B but also a minimum score difference threshold on the mapping of referring terms to entity terms. The minimum score difference threshold can be selected to be a value as desired by a practitioner, and it may be defined in response to user input.

Figure 7D:
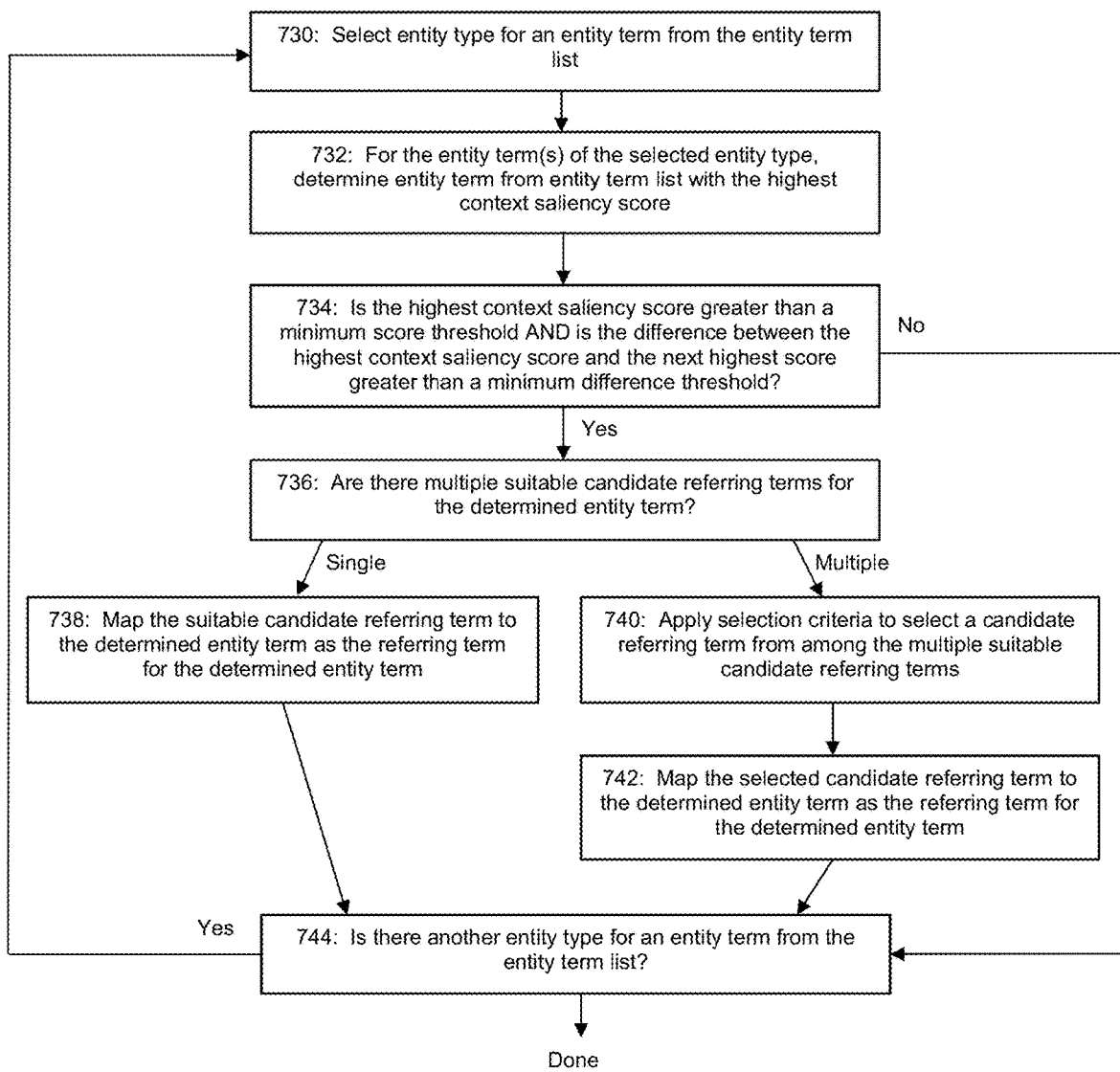

FIG. 7D shows an example of step 210 where the entity terms under consideration correspond to different entity types (for example, some of the entity terms in the sentence data may correspond to "students" and other entity terms in the sentence data may correspond to "teachers"). In such a situation, it may be desirable to perform step 208 on an entity type-by-entity type basis as shown by FIG. 7D. At step 730, a processor selects an entity type for an entity term from the entity term list. Then, step 732 operates similarly to step 700 but identifies the entity term with the highest context saliency score from among the entity terms that match the entity type selected at step 730. Thereafter, steps 734, 736, 738, 740, and 742 can operate similar to as described above for steps 722, 702, 704, 706, and 708 respectively. At step 744, a processor determines whether there is another entity type left for the entity terms on the entity term list. If so, the process flow can return to step 730.

It should be noted that a practitioner may choose to include control logic in step 210 that prevents re-use of the same referring term with different entity terms within the context window. For example, the acts of mapping at steps 704/708 may cause the mapped candidate referring term to be removed from the referring term list 252 or otherwise flagged for non-selection for the duration of the defined context window size. Such a control can help reduce ambiguity in the NLG output.

Returning to FIG. 2, at step 212, a processor checks for new sentence data to be processed. Once new sentence data is available, a processor performs entity referencing on the new sentence data based on the associations that have been created between entity terms and referring terms via mapping structure 254 (step 214).

Figure 8:
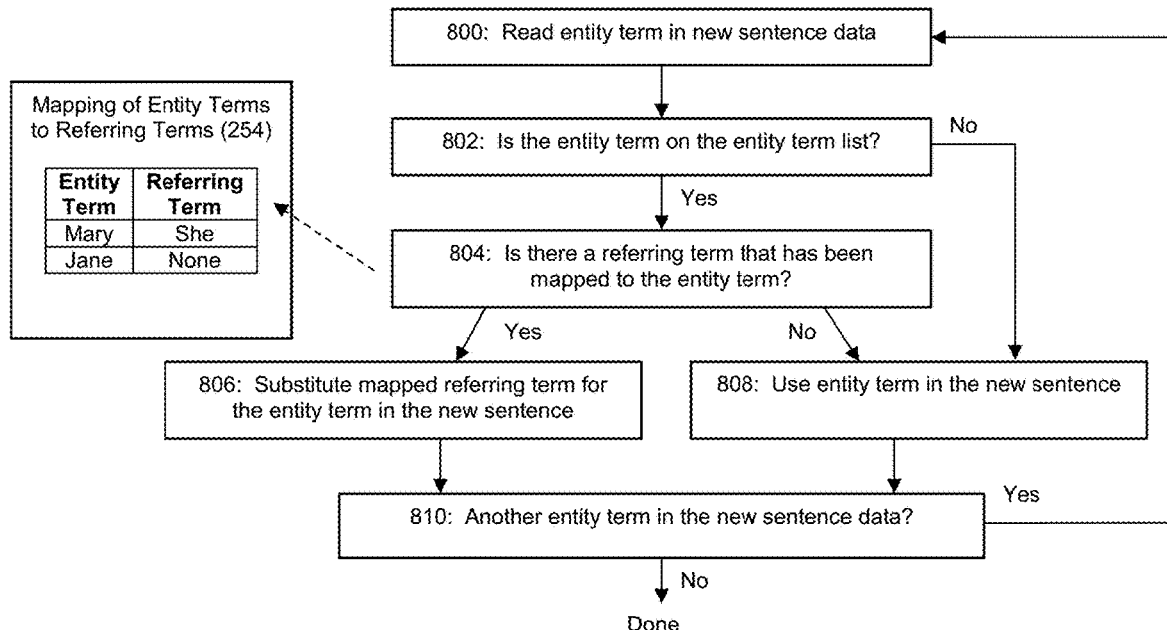
FIG. 8 discloses an example process flow for entity referencing based on the mapped referring terms.

FIG. 8 depicts an example process flow for step 214. At step 800, a processor reads an entity term in the new sentence data. At step 802, a processor checks whether this entity term is already on the entity term list 250. If not, the process flow proceeds to step 808, and the entity term will be used in the new sentence (because there is insufficient antecedent context saliency for using a referring term with respect to that entity term). If the entity term is already on the entity term list, then the process flow proceeds to step 804.

At step 804, a processor checks the mapping structure 254 to determine whether there is a referring term that has been mapped to that entity term. If yes, the process flow proceeds to step 806, and the mapped referring term is used in the new sentence to refer to the entity term (e.g., using "she" to refer to "Mary"). If not, the process flow proceeds to step 808, and the entity term is used in the new sentence (e.g., using "Jane" to refer to "Jane" because a referring term has not been mapped to "Jane").

At step 810, a processor checks for another entity term in the new sentence data. If another entity term is present, the process flow can return to step 800. Otherwise, the process flow can terminate.

The inventors further note that some practitioners may want the parser 110 to have the ability to also reference groupings of entity terms in the NLG output. For example, if the context window includes Mary and Jane as entity terms, it might be helpful to have the union of Mary and Jane available to reference in NLG output if necessary. To accommodate such a capability the process flow of FIG. 9 can be performed to selectively create compound entity terms from individual entity terms.

At step 900, a processor checks whether the entity term list includes two or more entity terms of the same entity type (e.g., both Mary and Jane are on the entity term list, and they are both "students"). If there not such entity terms, the process flow of FIG. 9 can terminate. However, if there are two or more entity terms of the same entity type, the process flow can proceed to step 902 where a compound entity term is created from the two or more entity terms of the same entity type. Next, at step 904, a processor computes a context saliency score for the compound entity term. This computation can be based on a combination of the context saliency scores for the constituent entity terms of the compound entity term (e.g., a sum of the context saliency scores for the constituent entity terms). At step 906, a processor populates the entity term list 250 with the compound entity term and its associated context saliency score. Then, at step 908, a processor populates the referring term list 902 with one or more suitable candidate referring terms for the compound entity term (e.g., the pronoun "they" for the compound entity term of "Mary and Jane"). Another candidate referring term that might be used for "Mary and Jane" may be "students" if the subject entity type is "student".

Figure 9:
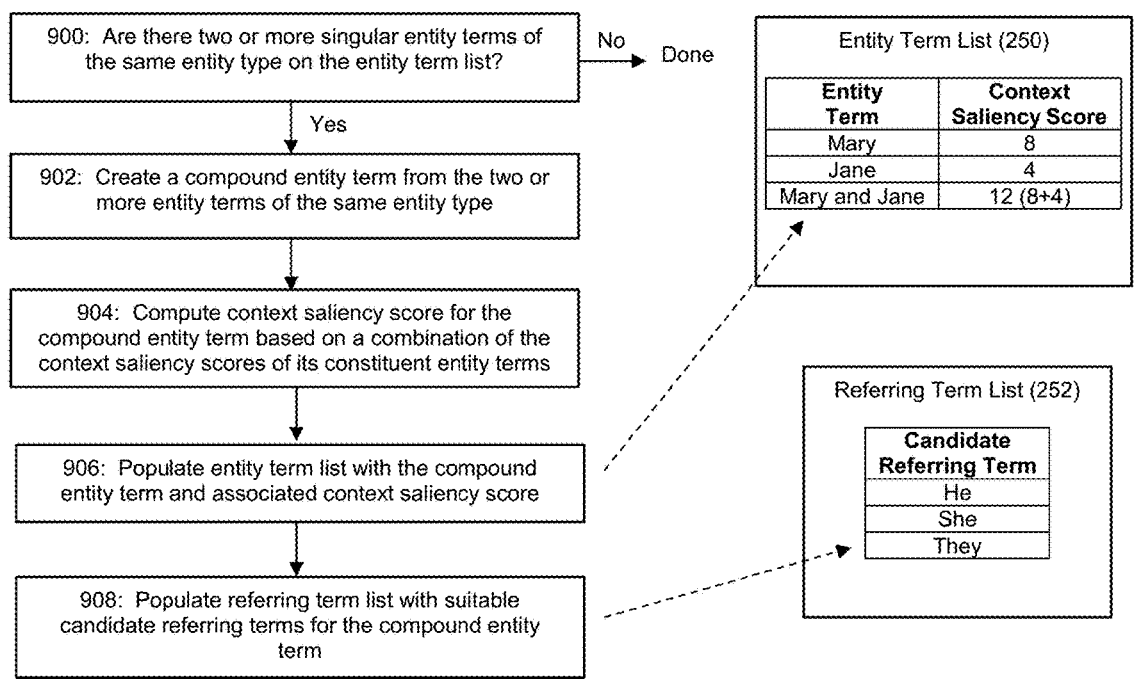
FIG. 9 discloses an example process flow for creating compound entity terms from singular entity terms.

If there are more than two entity terms that share the same entity type, the process flow of FIG. 9 can be performed for different permutations of the entity terms if desired by a practitioner. For example, if "Mary", "Jane", and "Bob" are students, then compound entity terms can be created for "Mary and Jane", "Mary and Bob", "Jane and Bob", and "Mary, Jane, and Bob".

Also, a practitioner might want to distribute saliency points back to individual entity terms when the compound entity term that encompasses those individual terms gets references in the sentence data. Thus, a reference to "Mary and Jane" in a sentence might cause context saliency points to also get added to the individual entity terms for Mary and Jane.

Returning to FIG. 2, at step 216, a processor updates the context window 112 after entity referencing has been performed. The context window 112 can be updated by adding the newly generated sentence to the context window 112 and shifting the prior sentences down by one in the window 112. This may cause a sentence to drop out of the context window 112. Step 216 can also involve updating the data structure 114. For example, as prior sentences are shifted in the context window, the context saliency scores associated with entity terms in those sentences may be updated to reflect score decay as discussed above. Also, if a referring term was included in the new sentence, this referring term might be removed from the referring term list 252 and/or mapping structure 254 or otherwise disabled to prevent it from being selected for use to refer to a different entity term. Similarly, a referring term might be added back to the referring term list 252 and/or mapping structure 254 or otherwise enabled for use with a different entity term if its prior usage with another entity term has dropped out of the context window 112.

Thus, FIG. 2 describes how an example deictic parser 110 can track and quantify the context saliency of entities that are referenced in a window of sentence data and then use this context saliency to make decisions about how those entities are referenced in the NLG output. However, it should be understood that the parser 110 could employ process flows different from the example shown by FIG. 2. For example, the order of various steps in FIG. 2 could be altered if desired by a practitioner (e.g., performing step 208 prior to steps 202-206). As another example, the mapping of referring terms to entity terms based on context saliency scores can be performed on an "on demand" basis as new sentence data is processed rather than pre-computing the mapped data structure 254. In such a case, step 212 may be performed prior to steps 200-210. As yet another example, the parser 110 could be configured to perform steps 200-210 and 216, while steps 212 and 214 could be performed by other logic in the NLG computer system 100. In such an example, the parser 110 can build and update the referential data structure 114 to make the referential data structure 114 available to the NLG computer system 100 when decisions are to made about entity referencing.

Example Use Scenarios for NLG:

FIGS. 10-14 depict various examples of how the deictic parser 110 can operate with various examples of sentence data.

In the example of FIG. 10, a referential data structure 114 is shown where the entity terms are tracked as (1) א, which tracks the saliency of entities that have been mentioned in the context window, and (2) ב, which tracks referring terms (R-terms).

In this example, the referring terms are split (at least) into the personal pronouns (PRO) and a list of each entity type (e-type) for the list of contextually salient entities. In the coding of FIG. 10, "3" refers to third person, "S" refers to singular, "P" refers to plural, "M" refers to masculine, "F" refers to feminine, and "N" refers to neuter. In this example, first and second person pronouns are ignored, although a practitioner may also want to take first and second person pronouns into consideration. Also, the lowercase Greek letters represent specific entities being mentioned—i.e. the specific entities that are being filtered down to (aka the extensional reference)—corresponding to the uppercase Greek letters in the R-terms that represent their entity type (although it should be understood that there need not be a 1:1 correspondence between entity terms and e-type referring terms—for example, a "student" e-type referring term may correspond to several different entity terms on the list (e.g., where Mary and Jane are students with respect to examples discussed above)). Each e-type has a singular and plural R-term. & is the join operator that denotes the entity group comprising α and β. The legend in FIG. 10 shows how these notations mapped to a set of entities that includes Mary (student), Ford (company), and Chrysler (company).

In the example of FIG. 11A, there is a prior sentence ($S_{-1}$) that has been processed by the parser, and this can result in the referential data structure shown by FIG. 11A where entity terms for "Mary", "Peter", and "Mary and Peter" have been added to the referential structure as well as associated R-term entity types ("student", "students"). This example assumes that "books" are not an entity type in the subject ontology 620 (although it should be understood that the parser 110 could also be configured to detect "books" as a new entity term and update the entity term list 250 accordingly if desired by a practitioner). FIG. 11B shows the referential data structure after context saliency scores have been computed using scoring rules such as those discussed above (where subjects get 8 points and direct objects get 4 points).

FIG. 11C further shows the referential data structure after entity terms have been associated with R-terms. In this example, entity terms are mapped to both the best fitting pronoun and the best fitting e-type (in terms of context saliency). Thus, the 3s.m pronoun is mapped to Peter, the 3s.f pronoun is mapped to Mary, the 3p pronoun is mapped to "Mary and Peter", "student" is mapped to Mary, and "students" is mapped to "Mary and Peter". As a result of this mapping, the most salient 3s.m referent is β (Peter), which means that the pronoun "he" would currently refer to that entity. For e-types, the most salient singular student is α (Mary), so using a demonstrative plus the e-type, this student, should have a preferential reference to her. The parser 110 can also know that the 3p pronoun, they, refers to the join α&β, Mary and Peter—as does the plural e-type students.

Now that the parser 110 has checked the context for entities, assigned them saliency scores, and resolved which entities each R-term refers to, this information can be used to decide which entity reference to use in the sentence currently being written. FIG. 11D depicts an example pair of sentences where we have two entity references we need to express: the join α&β and the singular α. To decide how to refer to these entities, the NLG system checks the parser 110 to see if we can use an R-term. In this case, it turns out that there are pronouns that refer to each of these salient entities: they and her, respectively, as shown by FIG. 11E.

Should there not have been a pronoun referring to the desired entity, but an e-type that does, the NLG system would use that with a demonstrative (or perhaps a definite determiner) to refer to the entity. Another case where the NLG system would default to a demonstrative could be if we are unable to use the pronoun for other reasons, such as needing to present a new fact on the entities via a relative clause, which do not attach well to pronouns. FIG. 11F depicts such an example with another sentence where +[F] indicates a new fact that needs to be expressed on an entity. Because the pronoun they is unavailable here due to the requirement of needing to add a fact as a relative clause, the parser 110 checks for an available e-type with the proper referent. In this case, it finds that student refers to the correct entity group, and thus uses that e-type with the demonstrative, which provides a noun to attach the relative clause to. Should there be no R-term that refers to the entity needing to be expressed, the NLG system can default to the specific entity reference: either the named identifier (Mary), or the filters that resolve to that entity (the student that read the most books), depending on how the entity was previously referred to (as configured by the user).

As noted above with respect to example embodiments, the parser 110 can not only look at a finite window for saliency, but it can also favor recency of information. The points assigned in the examples of FIGS. 11A-G above are based on looking at the previous sentence (let's call this sentence S −1 where S 0 is the current sentence to be written). Saliency points assigned for the entities in S −2 can have a reduced score according to decay function as discussed above. FIG. 12 shows an example of how this decay function can impact saliency. The example of FIG. 12 effectively sets a window where entities that are too far back in the discourse will never register as having any saliency. Still, it might make sense from an efficiency view to still define a window size that the parser 110 looks at as to avoid filling it with entities that will not get any saliency points. Any entity that was, but is no longer, within the parser's window would be removed from the parser 110 (and thus would need to be re-introduced by its specific reference before being considered again).

FIG. 12 shows an example that involves compound arguments, possessors, and oblique objects. As noted above, compound subjects, such as α&β can get assigned points both as joins and to each individual (explicitly priorly mentioned) entity that comprise them: points given to α&β can also get distributed to α and β. In an example, possessors of non-entities—e.g. Aaron Young's sales—can also get full points, since the narrative is still talking about the entity. However, things can get more complicated when both the possessor and possessee are entities: e.g. the student's teacher. In these cases, a practitioner may choose to assign more saliency to the possessee as it is the actual subject of the sentence. As an example, the parser 110 can assign the possessor half the points of the possessee in the event where they are both entities.

Non-core arguments (oblique arguments) are ones that are neither subjects nor objects of the top level sentence—and they normally show up in relative clauses; technically objects of prepositions are usually considered oblique arguments as well (modulo phrasal verbs). Oblique arguments can be scored lower than core arguments (2 in these examples). Another caveat is that unlike in the case of S −3, where the parser 110 created a join entity out of α and β, there is no new join entity created that includes γ, α&β's online business. We can also assume for now that join entities are only created for entities of the same e-type.

FIGS. 13 and 14 show another example that introduces another male entity (identified by the variable epsilon, who is named Norman), which demonstrates how the parser 110 can track saliency with competition present. FIG. 13 shows how sentence S0 introduces this new entity epsilon, and FIG. 14 shows the subsequent addition of this entity epsilon to the referential data structure (together with its context saliency score). FIG. 14 continues this example with a new sentence, where the sentence that references Norman has been moved to S−1.

Deictic Parser for NLP:

As explained above, the parser 110 can also be used to facilitate entity referencing going in reverse to improve NLP computer systems. For example, the parser 110 and referential data structure 114 can facilitate the inferencing of entity terms from referring terms in NLP input.

Figure 15:
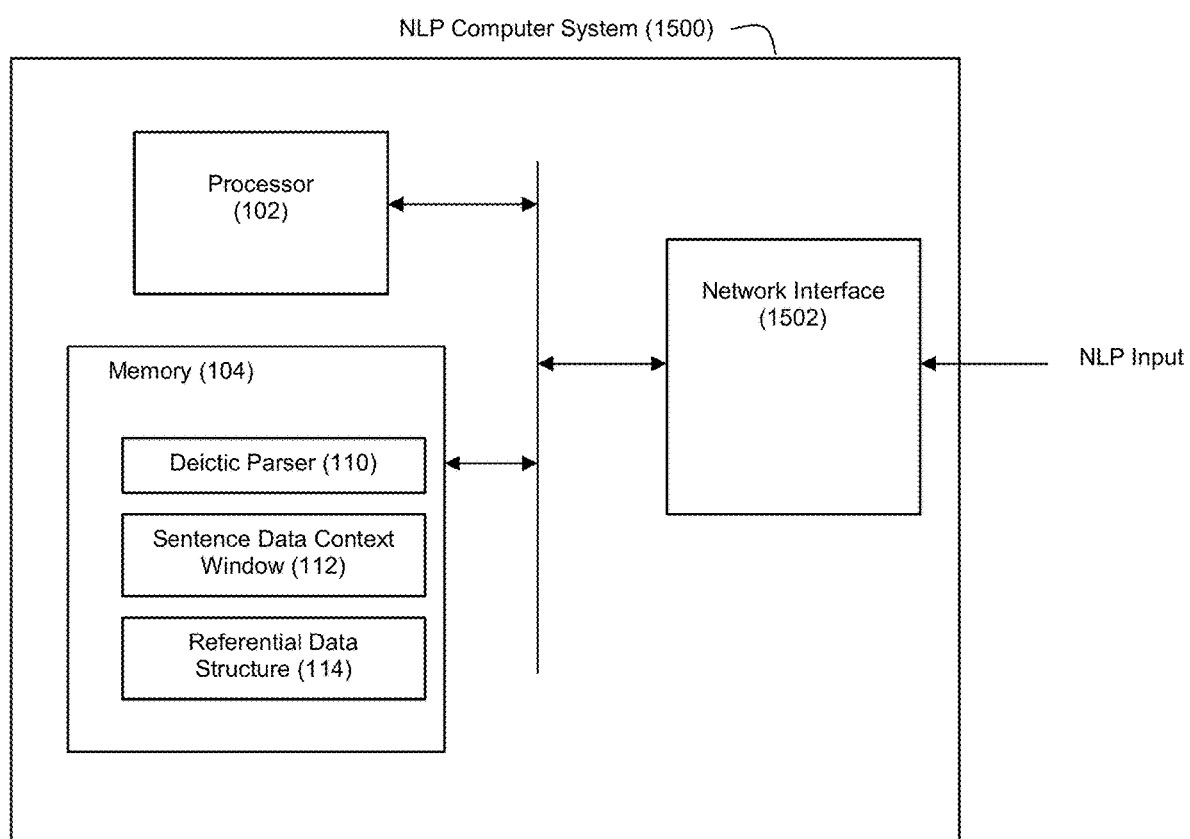
FIG. 15 discloses an example NLP computer system in accordance with an example embodiment.

FIG. 15 shows an example NLP computer system 1500 in accordance with an example embodiment. The NLP computer system 1500 comprises a processor 102 and memory 104 as discussed above. The NLP computer system 1500 may also comprise a network interface 1502 through which NLP inputs are received. As examples, the NLP inputs can be sentence data generated from a conversational interface such as a chatbot. It should be understood that the NLP computer system 1500 may include additional or different components if desired by a practitioner.

Figure 16:
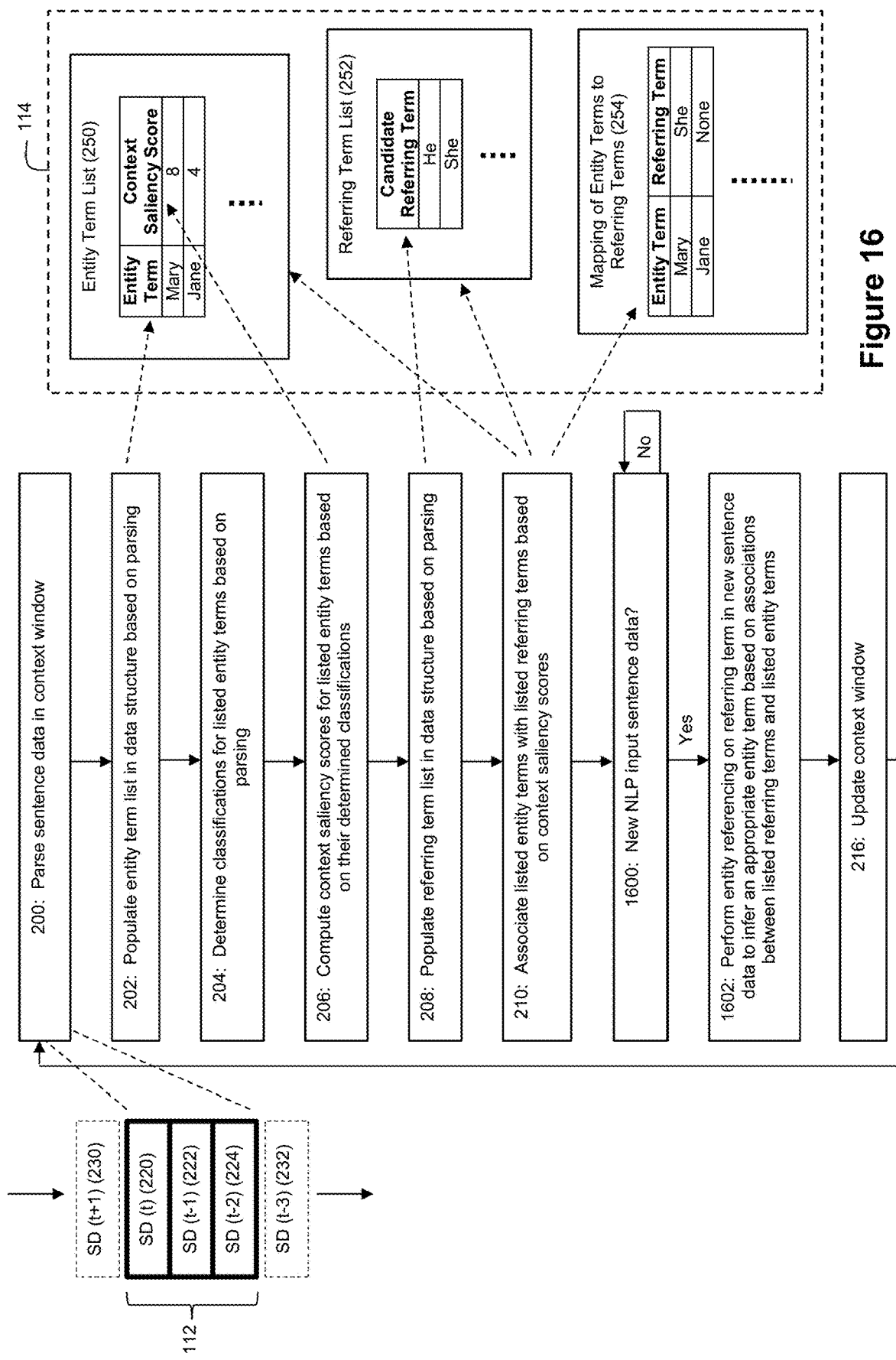
FIG. 16 discloses an example process flow for an example embodiment of a deictic parser for use with NLP.

When used for NLP, the parser 110 can operate in accordance with a process flow such as that shown by FIG. 16. Steps 200-210 and 216 can be performed as discussed above in relation to FIG. 2. However, while the NLG computer system 100 uses the parser 110 and referential data structure 114 to decide how and when referring terms should be used in place of entity terms in NLG output, the NLP computer system 1500 can use the parser 110 and referential data structure 114 to infer which entity terms are being referenced by a referring term that is present in the NLP input. Accordingly, at step 1600, new NLP input is received, where this NLP input can be represented as sentence data. At step 1602, a processor can access the referential data structure 114 (e.g., mapping structure 254) to select the entity term that is most context salient for the referring term that is present in the new sentence data.

For example, consider an example use case where the NLP computer system 1500 is used to process a conversational string between a human and a chatbot (in which case the context window may correspond to sentence data from both the human and the chatbot). In this example, the context window of sentence data may corresponding to the following conversation string:

User: "Who runs the sales division?"
Chatbot: "Mary does."
User: "Did Mary hire anyone last month?"
Chatbot: "Mary hired Jane"

In this context window, the parser 110 can score the entity term "Mary" with the highest context saliency, and the mapping data structure 254 would thus map the referring term "she" to "Mary". If the next NLP input is a question from the user such as "Who did she hire?", the NLP computer system 1500 will need to infer the specific entity term being referenced by the referring term "she" that is present in the new sentence data. In the example of FIG. 16, the NLP computer system 1500 can access the mapping data structure 254 to determine that "she" has been mapped to "Mary" and infer that "she" in the new sentence data refers to "Mary". Furthermore, the NLP computer system 1500 can operate in conjunction with an NLG computer system that produces a response the user's question, in which the context window for the NLG parser can be updated to reflect the new sentence in the conversation string (see step 216 in FIG. 16).

The inventors note that the use of the parser 110 in NLP scenarios may lead to some different internal settings for the parser 110 relative to an NLG use case. For example, a practitioner might find it useful to define a longer size for the context window in NLP cases to permit the NLP computer system 1500 to potentially pick up references to entities that may have occurred a longer time ago in a conversation string. While using "she" in NLG output might be unduly ambiguous if the last reference to an entity characterizable as a "she" occurred long ago in a string, the ability to infer meaning for "she" in a conversational string might benefit from a deeper context window. Also, a practitioner might apply different threshold values and/or different thresholds in an NLP context versus an NLG context. For example, two levels of thresholds might be implemented based on a confidence of the inferencing result. A high context saliency score (or a large difference between the highest context saliency score and the next highest context saliency score) can lead to a higher degree of confidence in an inferencing result. Thus, a threshold can be set based on the context saliency score (or the difference between the highest context saliency score and the next highest context saliency score) to define how confident the system is about the entity inference. If the score (or score difference) exceeds the threshold, the system can conclude that the inference is correct and proceed accordingly. If the score (or score difference) does not exceed the threshold, the system can be less confident about the inference, which might trigger the NLP computer system to ask a follow-up question to the user, such as "When you say "she", did you mean "Mary"?" or the like).

Furthermore, the inventors note that the NLG and NLP aspects of the parser 110 can be combined to operate in a computer system that both performs NLG and NLP—for example in a chatbot that may interactively engage in conversations with one or users.

As with the deictic parser 110 of FIG. 2, it should be understood that the parser 110 used for NLP could employ process flows different from the example shown by FIG. 16. For example, the order of various steps in FIG. 16 could be altered if desired by a practitioner (e.g., performing step 208 prior to steps 202-206). As another example, the mapping of referring terms to entity terms based on context saliency scores can be performed on an "on demand" basis as new sentence data is processed rather than pre-computing the mapped data structure 254. In such a case, step 212 may be performed prior to steps 200-210. As yet another example, the parser 110 could be configured to perform steps 200-210 and 216, while steps 1600 and 1602 could be performed by other logic in the NLP computer system 1500. In such an example, the parser 110 can build and update the referential data structure 114 to make the referential data structure 114 available to the NLP computer system 1500 when inferences are to made from entity references in NLP input.

While the invention has been described above in relation to its example embodiments, various modifications may be made thereto that still fall within the invention's scope. For example, while the examples described herein use people as examples of entity terms and personal pronouns as examples of referring terms tracked and mapped by the parser 110, it should be understood that the parser 110 can also operate on other types of deictic terms. For example, places can be tracked to determine when references such as "here" and "there" should be used. Another example would be where the parser 110 is used to track the context saliency of timeframes that are referenced in sentence data. Examples of referring terms that can be used with timeframe entities are "then", "that period", "the year prior", etc. Furthermore, when the parser 110 is used with timeframes, the NLG system can use the parser's context saliency scores for timeframes to help determine when specific references to timeframes can be omitted from sentences entirely (because the timeframe is likely to be fully understood from the context). An example of this would be for the sentences "In Q4, revenue increased sharply across most regions. Despite this increase, profit has remained the same". This example, the second sentence need not mention "in Q4" because it is a sufficiently salient timeframe in view of the prior sentence. Such modifications to the invention will be recognizable upon review of the teachings herein.

What is claimed is:

1. A natural language generation method that applies computer technology to sentence data for performing entity referencing, the method comprising:
    a processor parsing sentence data in a defined window of sentence data, wherein the parsing parses the sentence data into a list of entity terms and a plurality of classifications associated with the listed entity terms;
    a processor computing a plurality of context saliency scores for a plurality of the listed entity terms based on the classifications associated with the listed entity terms;
    a processor creating a data structure that associates a plurality of listed candidate referring terms with a plurality of the listed entity terms based on the context saliency scores and additional criteria;
    for new sentence data that refers to an entity term from among the listed entity terms, a processor selecting a referring term for referencing that entity term by selecting a candidate referring term that is associated by the data structure with the entity term from the new sentence data; and
    a processor forming the new sentence data such that the new sentence data includes the selected referring term to refer to the entity term from the new sentence data.

2. The method of claim 1 wherein the creating step comprises:
    a processor filtering the listed candidate referring terms for referencing the listed entity terms based on the additional criteria, wherein the additional criteria include person, number, and gender criteria;
    a processor determining whether the filtering resulted in a candidate referring term being deemed valid according to the additional criteria with respect to a plurality of entity term options from among the listed entity terms; and
    in response to a determination that the candidate referring term is deemed valid according to the additional criteria with respect to the plurality of entity term options, a processor associating that candidate referring term with an entity term option from among the entity term options based on which of the entity term options has the highest associated context saliency score.

3. The method of claim 2 further comprising:
    a processor conditioning the associating step on a difference between the associated context saliency scores for the entity term options being greater than a defined threshold.

4. The method of claim 1 wherein the listed candidate referring terms comprise (1) a plurality of entity types associated with the listed entity terms and (2) a plurality of pronouns.

5. The method of claim 4 wherein the data structure associates the entity term from the new sentence data with a pronoun and an entity type, and wherein the selecting step further comprises:
    a processor selecting the associated pronoun for use as the referring term with respect to the entity term from the new sentence data.

6. The method of claim 4 wherein the data structure associates the entity term from the new sentence data with a pronoun and an entity type, and wherein the selecting step further comprises:
    a processor determining whether the new sentence data qualifies the entity term to express a new fact about the entity term; and
    in response to a determination that the new sentence data is to express a new fact about the entity term from the new sentence data, a processor selecting the associated entity type for use as the referring term with respect to the entity term from the new sentence data.

7. The method of claim 4 wherein the data structure associates the entity term from the new sentence data with a pronoun and an entity type, and wherein the selecting step further comprises:

a processor determining whether the new sentence data qualifies the entity term to express a new fact about the entity term; and in response to a determination that the new sentence data does not express a new fact about the entity term from the new sentence data, a processor selecting the associated pronoun for use as the referring term with respect to the entity term from the new sentence data.

8. The method of claim 1 further comprising:

a processor updating the defined window in response to the new sentence data formation on a first in first out basis, wherein the updating step includes adding the new sentence data to the defined window; and repeating the parsing, computing, creating, selecting, forming, and updating steps with respect to additional new sentence data.

9. A natural language generation method that applies computer technology to sentence data for performing entity referencing, the method comprising:

a processor parsing sentence data in a defined window of sentence data, wherein the parsing parses the sentence data into a list of entity terms and a plurality of classifications associated with the listed entity terms;

a processor computing a plurality of context saliency scores for a plurality of the listed entity terms based on the classifications associated with the listed entity terms;

for new sentence data that refers to an entity term from among the listed entity terms, a processor selecting a referring term for referencing that entity term from a list of candidate referring terms based on the context saliency scores for the listed entity terms;

a processor forming the new sentence data such that the new sentence data includes the selected referring term to refer to the entity term from the new sentence data;

a processor updating the defined window in response to the new sentence data formation on a first in first out basis, wherein the updating step includes adding the new sentence data to the defined window;

a processor reducing the context saliency scores according to a decay function in response to the updating; and repeating the parsing, computing, selecting, forming, and updating steps with respect to additional new sentence data and using the reduced context saliency scores as a baseline for the repeat of the computing step with respect to the additional new sentence data.

10. A natural language generation method that applies computer technology to sentence data for performing entity referencing, the method comprising:

a processor parsing sentence data in a defined window of sentence data, wherein the parsing parses the sentence data into a list of entity terms and a plurality of classifications associated with the listed entity terms;

a processor computing a plurality of context saliency scores for a plurality of the listed entity terms based on the classifications associated with the listed entity terms;

for new sentence data that refers to an entity term from among the listed entity terms, a processor selecting a referring term for referencing that entity term from a list of candidate referring terms based on the context saliency scores for the listed entity terms;

a processor forming the new sentence data such that the new sentence data includes the selected referring term to refer to the entity term from the new sentence data;

a processor updating the defined window in response to the new sentence data formation on a first in first out basis, wherein the updating step includes adding the new sentence data to the defined window, wherein the updating step comprises a processor removing prior sentence data from the defined window;

a processor, in response to the prior sentence data removing step, removing an entity term from the listed entity terms in response to the removed entity term no longer being referenced in the sentence data included in the updated defined window; and repeating the parsing, computing, creating, selecting, forming, updating, and entity term removing steps with respect to additional new sentence data.

11. The method of claim 1 wherein the classifications include a subject classification and an object classification.

12. The method of claim 11 wherein the object classification comprises a plurality of different object classifications.

13. The method of claim 12 wherein the object classifications include a direct object classification.

14. The method of claim 13 wherein the object classifications further include an indirect object classification.

15. A natural language generation method that applies computer technology to sentence data for performing entity referencing, the method comprising:

a processor parsing sentence data in a defined window of sentence data, wherein the parsing parses the sentence data into a list of entity terms and a plurality of classifications associated with the listed entity terms, wherein the classifications include a subject classification and an object classification, wherein the object classification comprises a plurality of different object classifications including a direct object classification and an indirect object classification;

a processor computing a plurality of context saliency scores for a plurality of the listed entity terms based on the classifications associated with the listed entity terms, wherein the computing step comprises:

a processor assigning context saliency scores to the listed entity terms according to rules that (1) provide the listed entity terms associated with the subject classification higher context saliency than the listed entity terms associated with the direct object classification and (2) provide the listed entity terms associated with the direct object classification higher context saliency than the listed entity terms associated with the indirect object classification;

for new sentence data that refers to an entity term from among the listed entity terms, a processor selecting a referring term for referencing that entity term from a list of candidate referring terms based on the context saliency scores for the listed entity terms; and a processor forming the new sentence data such that the new sentence data includes the selected referring term to refer to the entity term from the new sentence data.

16. The method of claim 13 wherein the object classifications further include an oblique object classification.

17. A natural language generation method that applies computer technology to sentence data for performing entity referencing, the method comprising:

a processor parsing sentence data in a defined window of sentence data, wherein the parsing parses the sentence data into a list of entity terms and a plurality of classifications associated with the listed entity terms, wherein the classifications include a subject classification and an object classification, wherein the object classification comprises a plurality of different object classifications including a direct object classification and an oblique object classification;

a processor computing a plurality of context saliency scores for a plurality of the listed entity terms based on the classifications associated with the listed entity terms, wherein the computing step comprises:

a processor assigning context saliency scores to the listed entity terms according to rules that (1) provide the listed entity terms associated with the subject classification higher context saliency than the listed entity terms associated with the direct object classification and (2) provide the listed entity terms associated with the direct object classification higher context saliency than the listed entity terms associated with the oblique object classification;

for new sentence data that refers to an entity term from among the listed entity terms, a processor selecting a referring term for referencing that entity term from a list of candidate referring terms based on the context saliency scores for the listed entity terms; and a processor forming the new sentence data such that the new sentence data includes the selected referring term to refer to the entity term from the new sentence data.

18. A natural language generation method that applies computer technology to sentence data for performing entity referencing, the method comprising:

a processor parsing sentence data in a defined window of sentence data, wherein the parsing parses the sentence data into a list of entity terms and a plurality of classifications associated with the listed entity terms, wherein the classifications include a subject classification and an object classification;

a processor computing a plurality of context saliency scores for a plurality of the listed entity terms based on the classifications associated with the listed entity terms, wherein the computing step comprises:

a processor assigning context saliency scores to the listed entity terms according to rules that provide the listed entity terms associated with the subject classification higher context saliency than the listed entity terms associated with the object classification;

for new sentence data that refers to an entity term from among the listed entity terms, a processor selecting a referring term for referencing that entity term from a list of candidate referring terms based on the context saliency scores for the listed entity terms; and a processor forming the new sentence data such that the new sentence data includes the selected referring term to refer to the entity term from the new sentence data.

19. The method of claim 1 wherein the listed candidate referring terms comprise a plurality of pronouns.

20. The method of claim 1 wherein the listed candidate referring terms comprise a plurality of entity types associated with the listed entity terms.

21. The method of claim 20 further comprising:

a processor accessing an ontology related to the sentence data, the ontology including the entity types; and a processor mapping the listed entity terms to corresponding entity types in the accessed ontology.

22. A natural language generation method that applies computer technology to sentence data for performing entity referencing, the method comprising:

a processor parsing sentence data in a defined window of sentence data, wherein the parsing parses the sentence data into a list of entity terms and a plurality of classifications associated with the listed entity terms, wherein a plurality of the listed entity terms comprise singular entity terms;

a processor creating a compound entity term as a combination of a plurality of the singular entity terms, the compound entity term being included in the listed entity terms;

a processor computing a plurality of context saliency scores for a plurality of the listed entity terms based on the classifications associated with the listed entity terms;

for new sentence data that refers to an entity term from among the listed entity terms, a processor selecting a referring term for referencing that entity term from a list of candidate referring terms based on the context saliency scores for the listed entity terms; and a processor forming the new sentence data such that the new sentence data includes the selected referring term to refer to the entity term from the new sentence data.

23. The method of claim 22 wherein the computing step comprises:

a processor computing a context saliency score for the compound entity term as a combination of the context saliency scores for the singular entity terms from which the compound entity term was created.

24. A natural language generation method that applies computer technology to sentence data for performing entity referencing, the method comprising:

a processor parsing sentence data in a defined window of sentence data, wherein the parsing parses the sentence data into a list of entity terms and a plurality of classifications associated with the listed entity terms;

a processor computing a plurality of context saliency scores for a plurality of the listed entity terms based on the classifications associated with the listed entity terms;

for new sentence data that refers to an entity term from among the listed entity terms, a processor selecting a referring term for referencing that entity term from a list of candidate referring terms based on the context saliency scores for the listed entity terms;

a processor requiring the context saliency score for a listed entity term to be higher than a defined threshold in order for the method to use a listed referring term for referencing that listed entity term in new sentence data; and a processor forming the new sentence data such that the new sentence data includes the selected referring term to refer to the entity term from the new sentence data.

25. The method of claim 24 further comprising:

for new sentence data that refers to another entity term from the entity term list, a processor (1) comparing the context saliency score for the another entity term with the defined threshold and (2) in response to the comparing resulting in a determination that the context saliency score for the another entity term is less than the defined threshold, forming the new sentence data such that the new sentence data includes that listed entity term rather than a referring term for that entity term.

26. The method of claim 1 further comprising:

a processor defining a size for the defined window in response to user input.

27. The method of claim 1 wherein the sentence data comprises metadata about an entity term referenced in the sentence data.

28. A natural language generation apparatus for performing entity referencing on sentence data, the apparatus comprising:
- a memory; and
- a processor for cooperation with the memory, the processor configured to:
  - parse sentence data in a defined window of sentence data into a list of entity terms and a plurality of classifications associated with the listed entity terms;
  - compute a plurality of context saliency scores for a plurality of the listed entity terms based on the classifications associated with the listed entity terms;
  - create a data structure that associates a plurality of listed candidate referring terms with a plurality of the listed entity terms based on the context saliency scores and additional criteria;
  - for new sentence data that refers to an entity term from among the listed entity terms, select a referring term for referencing that entity term by selecting a candidate referring term that is associated by the data structure with the entity term from the new sentence data; and
  - form the new sentence data such that the new sentence data includes the selected referring term to refer to the entity term from the new sentence data.

29. A computer program product for natural language generation that applies computer technology to sentence data for entity referencing, the computer program product comprising:
- a plurality of processor-executable instructions that are resident on a non-transitory computer readable storage medium, wherein the instructions are configured, upon execution by a processor, to cause the processor to:
  - parse sentence data in a defined window of sentence data into a list of entity terms and a plurality of classifications associated with the listed entity terms;
  - compute a plurality of context saliency scores for a plurality of the listed entity terms based on the classifications associated with the listed entity terms;
  - create a data structure that associates a plurality of listed candidate referring terms with a plurality of the listed entity terms based on the context saliency scores and additional criteria;
  - for new sentence data that refers to an entity term from among the listed entity terms, select a referring term for referencing that entity term by selecting the candidate referring term that is associated by the data structure with the entity term from the new sentence data; and
  - form the new sentence data such that the new sentence data includes the selected referring term to refer to the entity term from the new sentence data.

30. A natural language generation apparatus for performing entity referencing on sentence data, the apparatus comprising:
- a memory configured to store a data structure that comprises (1) a list of entity terms from a sliding window of sentence data, (2) a plurality of context saliency scores associated with the listed entity terms, (3) a list of referring terms, and (4) a plurality of associations between the listed entity terms and the listed referring terms; and
- a processor configured to (1) analyze the sliding window of the sentence data to parse the sentence data in the sliding window into a plurality of entity terms and a plurality of classifications associated with the entity terms and (2) based on the analysis, (i) update the listed entity terms, (ii) compute the context saliency scores for the listed entity terms based on the classifications associated with the listed entity terms, and (iii) update the associations in the data structure between the listed entity terms and the listed referring terms based on the computed context saliency scores; and
- wherein the processor is further configured to control whether a plurality of entities are referenced in a sentence by an entity term from the listed entity terms or a referring term from the listed referring terms based on the associations in the data structure between the listed entity terms and the listed referring terms.

31. The apparatus of claim 30 wherein the processor comprises a plurality of processors.

32. The apparatus of claim 28 wherein the processor is further configured to create the data structure by:
- filtering the listed candidate referring terms for referencing the listed entity terms based on the additional criteria, wherein the additional criteria include person, number, and gender criteria;
- determining whether the filtering resulted in a candidate referring term being deemed valid according to the additional criteria with respect to a plurality of entity term options from among the listed entity terms; and
- in response to a determination that the candidate referring term is deemed valid according to the additional criteria with respect to the plurality of entity term options, associating that candidate referring term with an entity term option from among the entity term options based on which of the entity term options has the highest associated context saliency score.

33. The apparatus of claim 32 wherein the processor is further configured to condition the association of the candidate referring term with an entity term option on a difference between the associated context saliency scores for the entity term options being greater than a defined threshold.

34. The apparatus of claim 28 wherein the listed candidate referring terms comprise (1) a plurality of entity types associated with the listed entity terms and (2) a plurality of pronouns.

35. The apparatus of claim 34 wherein the data structure associates the entity term from the new sentence data with a pronoun and an entity type, and wherein the processor is further configured to perform the select operation by selecting the associated pronoun for use as the referring term with respect to the entity term from the new sentence data.

36. The apparatus of claim 34 wherein the data structure associates the entity term from the new sentence data with a pronoun and an entity type, and wherein the processor is further configured to perform the select operation by:
- determining whether the new sentence data qualifies the entity term to express a new fact about the entity term; and
- in response to a determination that the new sentence data is to express a new fact about the entity term from the new sentence data, selecting the associated entity type for use as the referring term with respect to the entity term from the new sentence data.

37. The apparatus of claim 34 wherein the data structure associates the entity term from the new sentence data with a pronoun and an entity type, and wherein the processor is further configured to perform the select operation by:
- determining whether the new sentence data qualifies the entity term to express a new fact about the entity term; and
- in response to a determination that the new sentence data does not express a new fact about the entity term from the new sentence data, selecting the associated pronoun for use as the referring term with respect to the entity term from the new sentence data.

38. The apparatus of claim 28 wherein the processor is further configured to:
update the defined window in response to the new sentence data formation on a first in first out basis, wherein the update includes adding the new sentence data to the defined window; and
repeat the parse, create, compute, select, form, and update operations with respect to additional new sentence data.

39. The apparatus of claim 38 wherein the processor is further configured to:
reduce the context saliency scores according to a decay function in response to the update; and
repeat the parse, create, compute, select, form, and update operations with respect to the additional new sentence data and use the reduced context saliency scores as a baseline for the repeat of the compute operation with respect to the additional new sentence data.

40. The apparatus of claim 38 wherein the processor is further configured to:
perform the update operation by removing prior sentence data from the defined window; and
in response to the prior sentence data removal, remove an entity term from among the listed entity terms in response to the removed entity term no longer being referenced in the sentence data included in the updated defined window.

41. The apparatus of claim 28 wherein the classifications include a subject classification and an object classification.

42. The apparatus of claim 41 wherein the object classification comprises a plurality of different object classifications.

43. The apparatus of claim 42 wherein the object classifications include a direct object classification.

44. The apparatus of claim 43 wherein the object classifications further include an indirect object classification.

45. The apparatus of claim 44 wherein the processor is further configured to perform the compute operation by:
assigning context saliency scores to the listed entity terms according to rules that (1) provide the listed entity terms associated with the subject classification higher context saliency than the listed entity terms associated with the direct object classification and (2) provide the listed entity terms associated with the direct object classification higher context saliency than the listed entity terms associated with the indirect object classification.

46. The apparatus of claim 43 wherein the object classifications further include an oblique object classification.

47. The apparatus of claim 46 wherein the processor is further configured to perform the compute operation by:
assigning context saliency scores to the listed entity terms according to rules that (1) provide the listed entity terms associated with the subject classification higher context saliency than the listed entity terms associated with the direct object classification and (2) provide the listed entity terms associated with the direct object classification higher context saliency than the listed entity terms associated with the oblique object classification.

48. The apparatus of claim 41 wherein the processor is further configured to perform the compute operation by:
assigning context saliency scores to the listed entity terms according to rules that provide the listed entity terms associated with the subject classification higher context saliency than the listed entity terms associated with the object classification.

49. The apparatus of claim 28 wherein the listed candidate referring terms comprise a plurality of pronouns.

50. The apparatus of claim 28 wherein the listed candidate referring terms comprise a plurality of entity types associated with the listed entity terms.

51. The apparatus of claim 50 wherein the processor is further configured to:
access an ontology related to the sentence data, the ontology including the entity types; and
map the listed entity terms to corresponding entity types in the accessed ontology.

52. The apparatus of claim 28 wherein a plurality of the listed entity terms comprise singular entity terms; and
wherein the processor is further configured to create a compound entity term as a combination of a plurality of the singular entity terms, the compound entity term being included in the listed entity terms.

53. The apparatus of claim 52 wherein the processor is further configured to perform the compute operation by computing a context saliency score for the compound entity term as a combination of the context saliency scores for the singular entity terms from which the compound entity term was created.

54. The apparatus of claim 28 wherein the processor is further configured to require the context saliency score for a listed entity term to be higher than a defined threshold in order for the processor to use a listed referring term for referencing that listed entity term in new sentence data.

55. The apparatus of claim 54 wherein the processor is further configured to, for new sentence data that refers to another entity term from among the listed entity terms, (1) compare the context saliency score for the another entity term with the defined threshold and (2) in response to the comparison resulting in a determination that the context saliency score for the another entity term is less than the defined threshold, form the new sentence data such that the new sentence data includes that listed entity term rather than a referring term for that entity term.

56. The apparatus of claim 28 wherein the processor is further configured to define a size for the defined window in response to user input.

57. The apparatus of claim 28 wherein the sentence data comprises metadata about an entity term referenced in the sentence data.

58. The apparatus of claim 28 wherein the processor comprises a plurality of processors.

\* \* \* \* \*